US012718524B2

(12) United States Patent
Shevtsov et al.

(10) Patent No.: US 12,718,524 B2
(45) Date of Patent: Aug. 25, 2026

(54) ARTIFICIAL INTELLIGENCE FOR ANIMAL IDENTIFICATION BASED ON ANIMAL BEHAVIOR

(71) Applicant: TOSHIBA GLOBAL COMMERCE SOLUTIONS, INC., Durham, NC (US)

(72) Inventors: Evgeny Shevtsov, Frisco, TX (US); John Pistone, Cary, NC (US); Philip S. Brown, Cary, NC (US); Leon T. Cain, II, Cary, NC (US); Vladyslav Kolbasin, Durham, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 461 days.

(21) Appl. No.: 18/177,006

(22) Filed: Mar. 1, 2023

(65) Prior Publication Data

US 2024/0296656 A1 Sep. 5, 2024

(51) Int. Cl.

*G06V 10/762* (2022.01)
*G06Q 30/0601* (2023.01)
*G06V 40/10* (2022.01)
*G06V 40/20* (2022.01)

(52) U.S. Cl.

CPC ..... *G06V 10/7625* (2022.01); *G06Q 30/0631* (2013.01); *G06V 40/10* (2022.01); *G06V 40/20* (2022.01)

(58) Field of Classification Search

CPC .... G06V 10/7625; G06V 40/10; G06V 40/20; G06V 10/98; G06V 10/94; G06V 40/23; G06V 40/25; G06Q 30/0631; G06Q 30/0639; A01K 11/006; A01K 29/005; A01K 15/02; A01K 15/021; G06T 19/006; G06T 7/0012; G06T 13/20; G06T 13/40; G06F 3/01; G06F 3/017; G06K 9/00671

See application file for complete search history.

(56) References Cited

U.S. PATENT DOCUMENTS

| | | | | |
|---|---|---|---|---|
| 9,142,028 B2 * | 9/2015 | Banhazi | ................. | G06V 40/10 |
| 9,665,703 B2 * | 5/2017 | Turgeman | ............... | G06F 21/32 |
| 9,747,436 B2 * | 8/2017 | Turgeman | ............... | G06F 3/017 |

(Continued)

FOREIGN PATENT DOCUMENTS

| | | | | |
|---|---|---|---|---|
| CN | 110070051 A * | 7/2019 | ............. | G06T 7/246 |
| CN | 118865451 A * | 10/2024 | ............... | G06N 3/08 |

OTHER PUBLICATIONS

·Zuerl; Matthias et al. “PolarBearVidID: A Video-Based Re-Identification Benchmark Dataset for Polar Bears”, Feb. 2023, MDPI (Year: 2023).*

*Primary Examiner* — John Villecco
*Assistant Examiner* — Alejandro Hernandez
(74) *Attorney, Agent, or Firm* — Patterson + Sheridan, LLP; Gero G. McClellan

(57) ABSTRACT

Techniques for animal identification based on animal behavior. A first video depicting a first animal associated with a user during a first visit to an enterprise location is received. One or more attributes pertaining to the first animal or to the user are received. A first behavior of the first animal as depicted in the first video is extracted and encoded into a first behavioral representation. One or more machine learning models are trained to identify the first animal based on the first behavioral representation and the one or more attributes.

20 Claims, 13 Drawing Sheets

(56) References Cited

U.S. PATENT DOCUMENTS 11,033,002 B1* 6/2021 Mundell ................ G06V 40/10
11,393,210 B2* 7/2022 Felhi ...................... G06V 20/52
11,425,892 B1* 8/2022 Bennett .................. G06V 40/18
11,840,260 B2* 12/2023 Mell ...................... G06V 20/56
11,967,154 B2* 4/2024 Li .......................... G06V 20/52
12,268,187 B2* 4/2025 Lau Caruso ......... A01K 29/005
2003/0229452 A1* 12/2003 Lewis .................. A01K 11/006 702/19
2006/0110049 A1* 5/2006 Liang ........................ G06T 7/20 382/224
2008/0082466 A1* 4/2008 Meijer ..................... G06N 7/01 706/12
2014/0314284 A1* 10/2014 Movellan ............. G06V 40/175 382/118
2015/0131868 A1* 5/2015 Rooyakkers ........ G06F 16/5866 382/110
2017/0154241 A1* 6/2017 Shambik ................ G06V 20/58
2017/0238505 A1* 8/2017 Gordon .................. A01K 15/00
2018/0260620 A1* 9/2018 Brent ...................... G06F 16/51
2020/0381119 A1* 12/2020 Gibbs .................... G16H 40/67
2021/0176970 A1* 6/2021 Engstrom .......... G05B 13/0265
2021/0271885 A1* 9/2021 Li .......................... G06V 20/41
2021/0357630 A1* 11/2021 Shaevitz .............. G06N 3/0464
2021/0386035 A1* 12/2021 Liao ........................ G06F 18/24
2022/0015334 A1* 1/2022 Mundell ................. G06F 3/167
2022/0201375 A1* 6/2022 Rijns ...................... G08C 17/02
2023/0108955 A1* 4/2023 Weissman .............. G16H 30/40 705/2
2023/0206678 A1* 6/2023 Jeon ....................... G06V 40/10 382/103
2023/0260327 A1* 8/2023 Canning ................. G06T 7/246 382/100
2023/0337630 A1* 10/2023 Elliott .................... G06V 40/10
2024/0005700 A1* 1/2024 Choo ..................... G06V 20/52
2024/0037734 A1* 2/2024 Fitzke .................. G06V 10/764
2024/0251758 A1* 8/2024 Fukada .................. A01K 11/00
2025/0131624 A1* 4/2025 Boyd ................... G06V 40/172
2025/0135150 A1* 5/2025 Puri ..................... A01K 15/021
2025/0356694 A1* 11/2025 Auclair .............. G06Q 30/0641
2026/0031233 A1* 1/2026 Lin ........................ G16H 50/30
2026/0033462 A1* 2/2026 Bawazer .............. A01K 29/007

* cited by examiner

ARTIFICIAL INTELLIGENCE FOR ANIMAL IDENTIFICATION BASED ON ANIMAL BEHAVIOR

BACKGROUND

With the ever-increasing variety and complexity of many systems and environments, it has become increasingly difficult (or, in many cases, impossible) to adequately and efficiently parse the multitudinous alternatives to identify the best approach or solution for a given situation or problem. These solution selections are made particularly more difficult when the individual making the selection lacks subject matter expertise or is otherwise overwhelmed with the number of alternatives. For example, individuals without veterinary expertise must often choose appropriate solutions or approaches for their animals with little or no guidance.

DETAILED DESCRIPTION

Figure 1A:
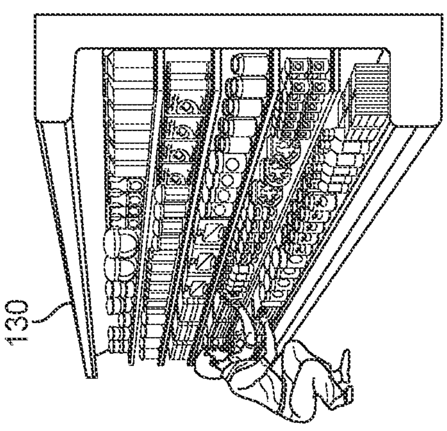
FIGS. 1A-1B depict example environments for using artificial intelligence to generate item recommendations, according to some embodiments disclosed herein.
Figure 1A:
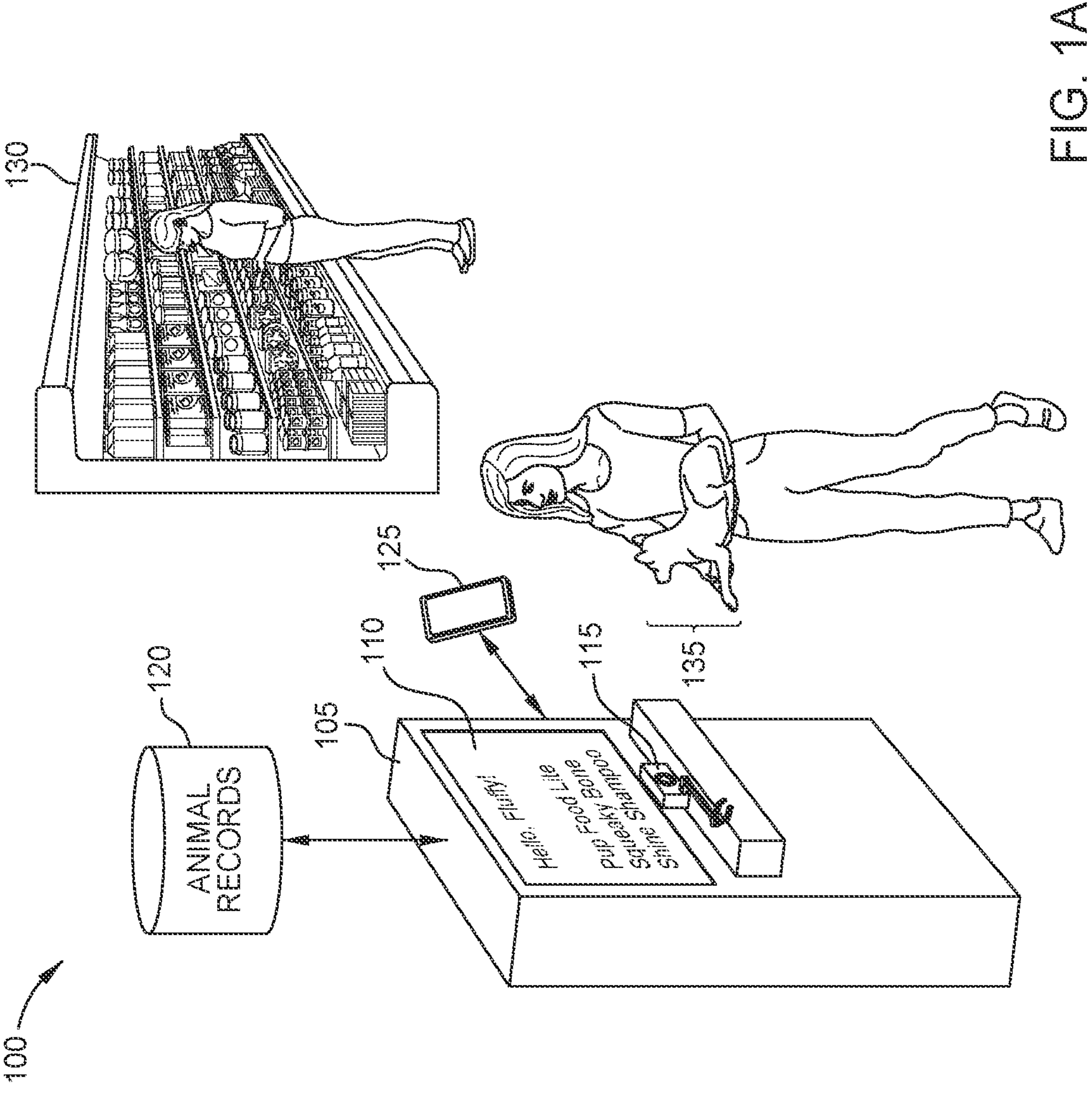

Embodiments of the present disclosure provide techniques for improved image capture and identification of animals, coupled with improved generation of solution recommendations for such identified animals using artificial intelligence.

Automated recognition of various animals can be useful for a wide variety of purposes, including to help assist with solution selection among a set of alternatives. However, conventional approaches to animal recognition are generally static and inaccurate. For example, though image processing has been used to broadly identify species, it is generally inaccurate for more fine-grained identification and further relies on high quality imagery of the animals themselves. As animals rarely cooperate in capturing such imagery, conventional approaches fail to operate in many realistic settings (e.g., outside of laboratory settings).

In some embodiments of the present disclosure, a check-in kiosk is provided in an enterprise location (e.g., a retail establishment). The check-in kiosk can generally be used by individuals (referred to in some aspects as users) to access or view a variety of information relating to the enterprise (e.g., maps of the enterprise, indications of item locations, and the like) and/or themselves (e.g., to access a profile or record of their purchase history, characteristics, and the like). In some embodiments, the kiosk includes a camera or imaging device that has an arm or other fixture which can be used to hold a treat or other object such that the user's pet, when looking at the treat, is oriented at or near a target angle for optimal image capture. This can provide stable, non-blurred, and ideally oriented pet face images to be easily captured, substantially improving facial recognition results.

In some embodiments, once the pet or other animal is identified, the kiosk can retrieve corresponding information for the pet (e.g., veterinary records) and evaluate this information using artificial intelligence (AI) to generate recommendations (e.g., recommended items that can be purchased or otherwise acquired in the enterprise establishment), such as specific foods or diet (e.g., to ensure the animal maintains a healthy or target weight). In some embodiments, the kiosk can then determine and indicate the location(s) of the suggested item(s) in the retail environment. For example, the kiosk may indicate the aisle and bay of the item(s). In some embodiments, an application on the smartphone of the user can receive and use the indicated location(s) to generate augmented reality (AR) imagery, such as to assist in navigation to the items (e.g., superimposing arrows or other markers on images captured by the smartphone).

In some embodiments, the kiosk can include an imaging device to capture one or more images of an animal of the user (e.g., the user's pet). In some embodiments, the imaging device can comprise an imaging sensor (e.g., a camera) physically coupled to an arm or other appendage or attachment positioned to hold objects in one or more positions, relative to the imaging sensor. For example, the imaging device may include an arm capable of holding objects (e.g., using a claw or grip mechanism) to attract the attention of the animal. For example, the arm may be configured to hold treats, food, toys, and the like. In some embodiments, the owner of the animal or another user may select or suggest which object(s) to use in order to best attract the animal's attention.

Advantages of Artificial Intelligence for Animal Identification and Item Recommendation In an embodiment, the arm of the imaging device can be attached such that the object (e.g., the treat) is held in a position, relative to the imaging sensor, such that when the animal looks at the object, the animal is facing or oriented in a particular direction or orientation relative to the imaging sensor. That is, when facing or looking at the object held by the arm, the animal may be oriented or facing in an ideal or optimal direction such that the captured image(s) can be effectively and accurately used for machine learning-based identification of the animal.

In some embodiments, once the image(s) are captured, the kiosk can process the image(s) using one or more machine learning models (e.g., pet or other animal recognition or identification machine learning models) to identify the animal. The captured images can include physical behavior of the animal. The animal can be identified using a sequence of machine learning models of successively finer granularity of animal classification. In an embodiment, identifying the animal includes or corresponds to determining a unique identifier of the animal. That is, the kiosk can identify the animal uniquely, rather than simply classifying its breed or other characteristic. For example, the kiosk may use machine learning to identify the animal's name or other unique identifier (e.g., a unique numerical value assigned to the animal). That is, the model may enable animal identification and differentiation even between different animals of the same breed, even if they appear visually similar (e.g., a poodle named "Fluffy" belonging to user Bob may be differentiated from a poodle named "Fluff Ball" belonging to user Bill).

In some embodiments, once the animal is uniquely identified, the kiosk can access one or more corresponding records associated with the animal. As used herein, accessing data can generally include receiving, retrieving, requesting, or otherwise gaining access to the data. For example, the kiosk may use the unique identifier to lookup the animal's records in a database of records. The records can generally include a variety of information relating to characteristics of the animal, including medical or veterinary records, grooming records, historical selection or purchase records, and the like.

For example, the records may include characteristics such as the identity of the animal's owner, the animal's species and/or breed, the animal's current weight and/or ideal/target weight, any current or past diagnoses of the animal, any current or past illnesses of the animal, any behavioral concerns, any preferences of the animal (e.g., previously indicated by the owner or another user, such as a preference for fish-based foods over chicken-based foods), and the like.

In some embodiments, the kiosk (or another system) can then evaluate or process some or all of such records in order to generate recommendations for the animal. For example, the kiosk may use one or more artificial intelligence (AI) systems to generate recommendations based on the records. The recommendations can generally include a wide variety of suggestions, including nutritional recommendations, activity recommendations, and the like. For example, the AI may suggest toy(s) for the animal, medication(s) for the animal, care products (e.g., shampoos, coat conditioners, and the like), food (e.g., types and/or brands), and the like. In some embodiments, the recommendations can be generated based not only on the animal's characteristics, but also based on other data such as inventory data (e.g., to avoid suggesting an item that is out of stock), promotional data (e.g., to suggest items that are discounted), and the like.

In some embodiments, the kiosk can then output the determined animal characteristics/information and/or generated suggestions, such as via a display. In some embodiments, the kiosk may further determine the physical location(s) of one or more suggested items (e.g., identifying the aisle, bay, shelf, or other storage location in the enterprise). These locations may be optionally output to the user.

In some embodiments, the item locations can be transmitted or otherwise provided to a device of the user (e.g., the user's smartphone). In at least one embodiment, the user can then use their device to navigate to the location(s) of the items. For example, the user may use their smartphone to capture images or video in the enterprise, and an application on the smartphone may use augmented reality (AR) to augment the images to indicate the item locations (such as by adding arrows or other marks on the ground, highlighting or circling items on the shelf, and the like).

In this way, the kiosk system can provide substantial functionality and operability not available with other systems. For example, the kiosk can use improved image capture techniques, such as by using a camera with an attached arm, to enable more efficient and accurate identification of animals. Similarly, the kiosk may use trained machine learning model(s) to perform this identification, and further use AI to provide recommendations based on the animal's unique characteristics. These recommendations can then be used to provide dynamic navigation assistance to the user, significantly improving their experience.

Figure 1B:
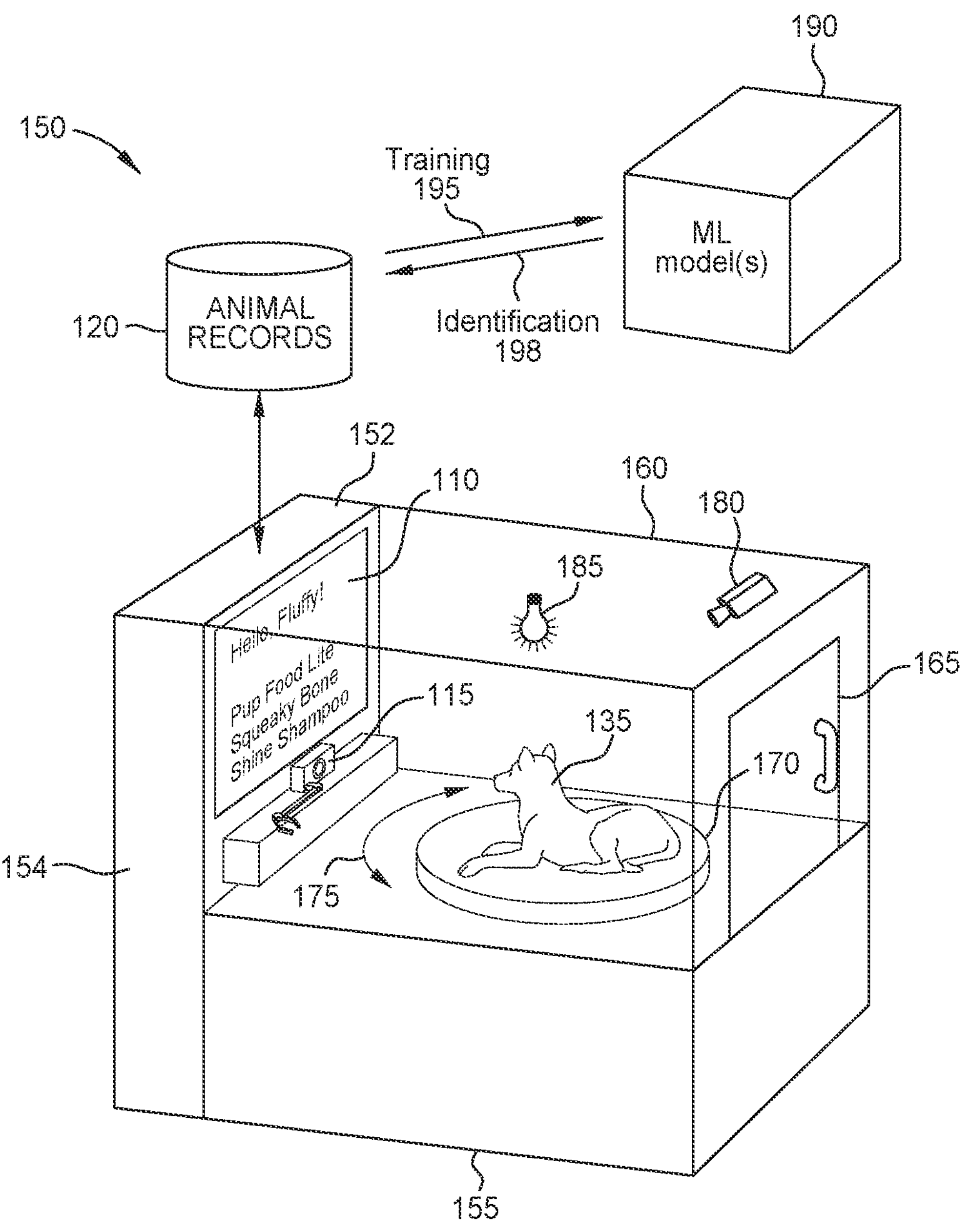

FIGS. 1A-1B depict example environments 100, 150 for using artificial intelligence to generate item recommendations, according to some embodiments disclosed herein.

As shown in FIG. 1A, the environment 100 includes a check-in kiosk 105 communicatively coupled with a set of animal records 120 and a camera device 115. The check-in kiosk 105 generally corresponds to a computing device in a physical enterprise, such as a retail environment, that allows users to check-in/access various data. For example, as discussed above, users may use the check-in kiosk 105 to identify their animals, access records, view recommended items, and the like.

In an embodiment, the animal records 120 generally correspond to any records associated with one or more animals, such as veterinary records, behavioral records, grooming records, purchase information, or other profiles of the animal (e.g., indicating preferences). Although depicted as a discrete database external to the check-in kiosk 105 for conceptual clarity, in embodiments, the animal records 120 may generally reside in any suitable location (such as within the check-in kiosk 105, or externally, such as in a cloud storage). Further, though a single repository of animal records 120 is depicted for conceptual clarity, in embodiments, the records may be distributed across any number and variety of repositories and data sources.

In the illustrated example, the check-in kiosk 105 includes or is associated with a camera device 115 that can be used to capture image(s) of the user's animal(s), such as the animal 135. In an embodiment, the camera device 115 may be a discrete device, separate from the check-in kiosk 105, that can be picked up/handled (while the check-in kiosk 105 itself may be relatively fixed in place). For example, the camera device 115 may be a handheld device that docks to, can be placed on or in, or otherwise attaches to the check-in kiosk 105 (e.g., for charging purposes, or simply to keep it in a secure or known location).

The camera device 115 may be communicatively coupled to the check-in kiosk 105, such as using one or more wireless techniques (e.g., via a wireless local area network (WLAN) or via a direct connection such as Bluetooth) and/or wired techniques (e.g., via a physical cable). In some embodiments, the camera device 115 includes both an imaging sensor and an attached arm arranged to hold objects (e.g., treats) relative to the imaging sensor such that the animals orient themselves in an ideal, optimal, or target direction (relative to the sensor) that enables improved identification accuracy, as discussed in more detail below.

In some embodiments, after a user uses the camera device 115 to capture image(s) of their animal, the check-in kiosk 105 evaluates the image(s) using machine learning to identify the animal to retrieve corresponding records from the animal records 120. These records can then be evaluated using AI to generate recommendations. In the illustrated example, the check-in kiosk 105 may output some or all of these recommendations via a display 110.

In the depicted example, the display 110 includes a greeting that identifies the animal and/or owner (e.g., "Hello, Fluffy!"), as well as a list of recommended items generated using AI (e.g., "Pup Food Lite," "Squeaky Bone," and "Shine Shampoo"). Though not depicted in the illustrated example, in some embodiments, the display 110 may further include the physical location(s) of the items (e.g., the aisle and bay number of each). In some embodiments, the check-in kiosk 105 outputs the locations in response to receiving user selection of the item. That is, the display 110 may output the item(s), allowing the user to review and select one or more (e.g., using a touchscreen). When the user selects an item, the display 110 may update to indicate the corresponding location(s).

For example, the check-in kiosk 105 may indicate that the "Pup Food Lite" can be found in an aisle 130 (e.g., "Aisle 4"), in a bay (e.g., "Bay C"), and/or on a shelf (e.g., "Bottom Shelf"). In this way, the user can quickly identify and navigate to the recommended items.

Additionally, though not depicted in the illustrated example, in some embodiments, the check-in kiosk 105 may further provide additional information relating to the items, such as image(s) of the items, description(s) and/or review (s) of the products, and the like. In some embodiments, the check-in kiosk 105 selectively outputs such additional information in response to user selection of the item, as discussed above.

Although the illustrated example depicts a check-in kiosk 105, in some embodiments, the kiosk can be implemented as part of any computing device, including a check-out kiosk where users purchase items, or as a standalone device (e.g., a terminal that is not necessarily used for check-in or check-out).

In the illustrated example, the environment 100 further includes a user device 125 (e.g., a smartphone). In some embodiments, the user device 125 may be communicatively coupled with the check-in kiosk 105, such as via a short-range radio communication, a WLAN, a wide area network (WAN) such as the Internet, and the like. In some embodiments the user device 125 executes or includes an application (referred to in some aspects as an "app") that interfaces with the check-in kiosk 105 (or with the back end server, such as in a cloud deployment).

For example, the retrieved animal records may be output via the user device 125 in some embodiments. In some embodiments, the generated item recommendations and/or locations may be provided to the user device 125. For example, the user may use the user device 125 to generate or access a list of the recommended items, and may interact with this list as they move throughout the environment (e.g., to see more information on each item, such as the location). In this way, the user can use the check-in kiosk 105 to generate the recommendations, and forward the recommendations to their own user device 125 for use.

In some embodiments, video footage of the animal can be captured. In some embodiments, the captured images described in conjunction with FIG. 1A constitute the video footage. In other embodiments, the video footage constitutes more accurate and/or extensive footage than the captured images and is at least in part captured separately from the captured images. In this regard, the video footage can constitute more accurate and/or extensive footage in terms of one or more video attributes such as video resolution, video bit rate, video length, video sharpness, and the like. Further, the video footage can be stored in a binary format. In addition, prior to storing the video footage, the video footage can be converted from a source binary format to a target binary format to better suit the machine learning models. In some embodiments, the video footage is only obtained responsive to a request from the user to register or enroll the animal into an animal identification program provided by the enterprise.

Depending on the embodiment, the video footage can be captured via the kiosk 105 of FIG. 1A or a kiosk 152 of FIG. 1B. In addition, an image of the animal can be captured via the kiosk 105 or the kiosk 152. In some embodiments, the image constitutes a headshot of the animal, while the video footage constitutes full-body footage of the animal. In other embodiments, the image constitutes a full-body portrait of the animal. Depending on the embodiment, the kiosks 105, 152 can be the same kiosk, the same type of kiosk, different kiosks of the same type, different kiosks of different types, or different kiosks having at least some overlap in form and/or functionality.

As shown in FIG. 1B. the environment 150 includes a video-capture booth 154 that includes the kiosk 152. The kiosk 152 in this example corresponds at least in part to the kiosk 105 of FIG. 1A. The video-capture booth 154 also includes a riser 155 that serves to elevate the animal 135 such as to better capture video footage of the animal 135. Additionally or alternatively, the video-capture booth 154 includes one or more light sources, such as a light source 185. Depending on the embodiment, the video footage of the animal 135 can be captured by any number of camera devices, including one or more of the camera device 115 and a camera device 180. As shown, the camera device 115 is disposed proximate to a front end of the video-capture booth 154, whereas the camera device 180 is disposed proximate to a rear end of the video-capture booth 154.

In one embodiment, the video-capture booth 154 also includes a turntable 170 disposed atop the riser 155. As signified by arrows 175 in FIG. 1B, the turntable 170 is physically rotatable about an axis substantially perpendicular to a face of the turntable 170. The physical rotation of the turntable 170 can be controlled via an application, which can execute on a computer local to the kiosk 154 or on a remote computer operatively connected to the local computer via a network. The local computer can be contained within a physical housing of the kiosk 154. At least in some embodiments, the physical rotation of the turntable 170 can be controlled in an absence of user input to the application.

Additionally or alternatively, one or more of the camera devices 115, 180 can be controlled by the application. In this regard, one or more camera properties can be adjusted, including camera resolution, camera bit rate, image sharpness, camera focus, optical zoom, digital zoom, etc. Still additionally or alternatively, one or more light sources in the booth, such as the light source 185, can be controlled by the application. In some embodiments, some or all of the camera devices 115, 180, the light source 185, and the turntable 170 can be controlled based at least in part on user input. The user input can include real-time input from an attendant on duty at the physical enterprise or through a remote location via the application.

At least in some embodiments, the application controls the turntable 170 and/or the camera devices 115, 180 to facilitate capturing the video footage of the animal 135. The video footage depicts the animal over a specified period of time and as the animal physically moves within the booth. As such, the video footage captures physical behavior of the animal over the specified period of time, where the physical movement of the animal within the booth constitutes the physical behavior captured in the video footage.

As used herein, the physical behavior of the animal refers to any behavior from which a pattern of behavior can be identified by the application. The behavior can include static behavior, dynamic behavior, or a combination of static and dynamic behavior over time. Static behavior broadly refers to any measure of inaction or lack of movement of the animal over a reference time period. At least in some embodiments, even static behavior can be relied upon by the application to perform animal identification, at least to the extent that such static behavior constitutes a mannerism that distinguishes an animal from other animals. In contrast, dynamic behavior broadly refers to any measure of physical action or movement on the part of the animal a reference time period.

In one embodiment, the physical size and dimensions of the video-capture booth 154 can be tailored to suit the needs of a particular case. For instance, video-capture booths of greater sizes can permit a wider range of movement of the animal and can result in machine learning models that can identify the animal with a greater measure of accuracy.

As shown, the video-capture booth 154 includes a door 165 disposed in a doorway through which the pet 135 can be placed into an interior of the video-capture booth 154. Depending on the embodiment, the door 165 can be a sliding door, a hinged door, or a detachable door; other door types are broadly contemplated. In some embodiments, the interior of the video-capture booth can be visible through a housing 160 that contains and defines the interior, where the housing is disposed above the riser 155.

In one embodiment, the housing 160 can be at least partially transparent to allow the user who owns the animal 135 to monitor the well-being of the pet throughout a process of capturing the video footage of the animal 135. This transparency of the housing 160 is conveyed in FIG. 1B in the form of dotted lines. In an alternative embodiment, however, the housing is substantially opaque, and the well-being of the pet can be monitored via an external display device that shows real-time video footage of the animal 135 inside the video-capture booth 154.

As with the kiosk 105 of FIG. 1A, the kiosk 152 of FIG. 1B can be configured to apply machine learning models 190 to learn, based at least in part on the captured video footage of the animal 135, to identify the animal 135 during a subsequent visit by the user and the animal 135 to a same or different physical establishment of the enterprise. To that end, the one or more attributes and/or the captured image can also be provided as input data to the machine learning models 190. In some embodiments, the animal 135 is identified based further on providing the captured image of the animal 135 to an additional machine learning model trained to take a captured image rather than video footage as input data. To that end, the one or more attributes can also be provided to this additional machine learning model. Training 195 and use of the machine learning models 190, the use including animal identification 198, are further described in conjunction with the FIGS. 8-11.

Figure 2:
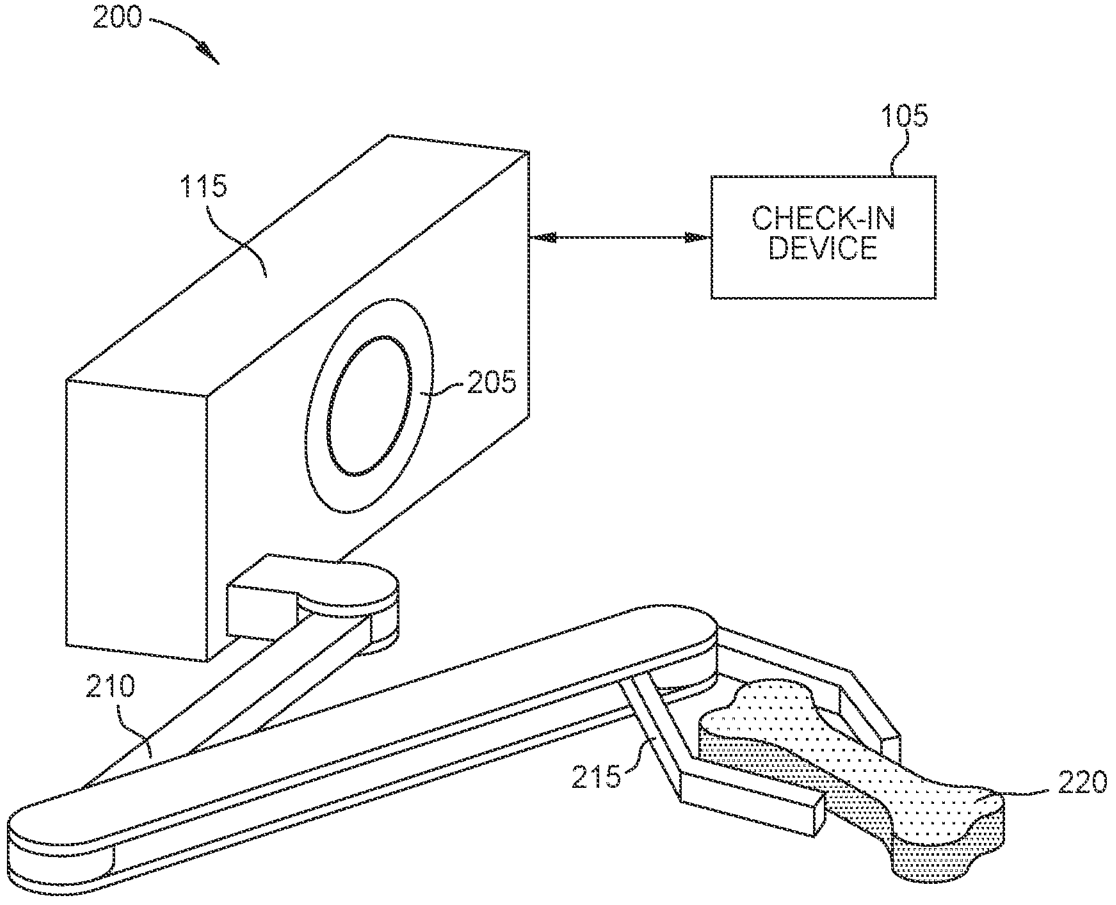
FIG. 2 depicts an example camera device for improved image capture to enable animal identification using machine learning, according to one embodiment disclosed herein.

FIG. 2 depicts an example camera device 115 for improved image capture to enable animal identification using machine learning, according to one embodiment disclosed herein.

In the illustrated example, the camera device 115 is communicatively coupled with a check-in kiosk 105, as discussed above. For example, the camera device 115 may have one or more wireless links to the check-in kiosk 105, or may be coupled to the check-in kiosk 105 using a wired connection. In some embodiments, if the camera device 115 is a wired device, the wire/cable may be used to exchange data with the check-in kiosk 105, as well as to receive power from the check-in kiosk 105. In some embodiments, if the camera device 115 is a wireless device, the camera device 115 may include one or more charging ports or components that enable the camera device 115 to be charged (e.g., by the check-in kiosk 105), such as by placing electrical pads of the camera device 115 in contact with pads on the check-in kiosk 105, or by placing an inductive charging component of the camera device 115 (e.g., a power receiving or secondary coil) on or near an inductive charging component of the check-in kiosk 105 (e.g., a power transmitting or primary coil). In this way, the user may return the camera device 115 to its charging location after use, allowing it to be charged for the subsequent user(s).

As illustrated, the camera device 115 includes an imaging sensor 205. The imaging sensor 205 is generally representative of any sensor or component capable of capturing image(s), which may include individual (still) images and/or video (e.g., a sequence of images). The camera device 115 further includes an arm 210 positioned to hold an object 220 (e.g., a treat) in a position relative to the imaging sensor 205.

In the illustrated example, the object 220 is held to the arm 210 by a claw or grip component 215. For example, the claws or fingers of the grip component 215 may be spring loaded such that they can be pulled apart/open, an object 220 can be inserted, and the grip component 215 can hold itself closed on the object 220 using spring pressure to hold the object 220 in place. Generally, any grip component 215 may be used to hold the object 220 to the arm 210, and the particular configuration and techniques used to hold the object 220 may vary depending on the particular implementation.

In some embodiments, the object 220 is selected or suggested (e.g., by the check-in kiosk 105, or by a user) to attract the attention of the user's animal. For example, the check-in kiosk 105 may suggest or instruct the user to use a bone treat if the user has a dog, a fish treat if the user has a cat, and so on. That is, there may be predefined suggestions (e.g., bins of treats on or near the check-in kiosk 105) for various common species or breeds, such that users can readily identify and select an object 220 to tempt their animal. Although the illustrated example depicts a treat, in embodiments, the object 220 can generally be any item that might attract the attention of an animal, including food (whether animal food or food intended for human consumption), a toy, and the like. Similarly, the object 220 and/or arm 210 may be static (e.g., a stuffed toy) or dynamic (e.g., that outputs lights and/or sound).

As discussed above, the arm 210 is generally attached or arranged so as to hold the object 220 in a position relative to the imaging sensor 205. In the illustrated example, the arm 210 holds the object 220 in front of the imaging sensor 205 such that, when the animal looks at the object 220, they are also facing in the direction of the imaging sensor 205.

That is, the arm 210 may be positioned to hold the object 220 directly in line with the imaging sensor 205, such that the object 220 is held directly between the animal and the imaging sensor 205. Although the illustrated example suggests that the object 220 is held in the line of sight of the imaging sensor 205 (e.g., as if the captured image(s) will include the object 220 in them), in embodiments, the arm 210 may be positioned to hold the object 220 just below or above the view of the imaging sensor 205, and/or off center (such that the animal's face can be placed in the center of the frame).

In an embodiment, positioning the object 220 between the camera and the animal (e.g., above or below the center of the imaging sensor 205) allows the camera device 115 to capture an image of the animal's face straight on (e.g., with the mouth, both eyes, both ears, and/or the nose visible). Generally, the arm 210 may be positioned to cause the animal to face any orientation relative to the imaging sensor 205, depending on the particular implementation (e.g., depending on the particular machine learning model used to identify the animal). For example, the arm 210 may hold the object 220 such that the imaging sensor 205 captures the animal's profile (e.g., looking sideways with one eye visible), in ¾ profile, and the like. Generally, the camera device 115 may position the object 220 in any suitable location for any target angle or orientation of the animal's face.

Advantageously, the camera device 115 can thereby enable users to easily capture image(s) or video(s) of their animal that are more likely to result in accurate predictions or identifications using various machine learning models. That is, such models may generally return more accurate identifications and/or identification with higher confidence when portions of the animal's face are visible in the image.

In some embodiments, rather than being fixed/unchangeable, the arm 210 may be configurable (e.g., movable) to allow the camera device 115 to take images with differing angles. For example, the arm may be pivoted or moved to different angles or positions to cause the animal to look sideways, slightly turned, directly on, upwards, downwards, and the like. For example, in the illustrated embodiment, the arm 210 includes two beams connected by multiple pivots/joints, allowing the arm 210 to be moved or reconfigured to place the object 220 in a different location. In some embodiments, the camera device 115 may be reconfigured depending on the identification model being used. For example, if the identification model is trained using images captured from an angle (e.g., ¾ profile), the camera device 115 may be reconfigured (manually or automatically) to hold the object 220 towards one side of the imaging sensor 205, such that the captured images are in ¾ profile. This can significantly improve model accuracy.

Generally, without the camera device 115 (e.g., using a smartphone camera, such as incorporated into the user device 125 of FIG. 1A), it is often difficult or impossible to capture images with the animal looking in the target direction. For example, without the arm 210, the user may resort to using their hand(s) orient the animal's face, such as by physically turning it or by holding an object themselves. Such approaches less effective than using the camera device 115. For example, they often result in blurred images and/or image(s) that are not well framed. Such images may be unsuitable for use with identification machine learning models, or at least result in reduced accuracy and/or confidence in the model output. In contrast, using the camera device 115, the user can easily capture images that are not blurred and are optimally oriented and framed. In this way, the camera device 115 enables significantly improved identification using the machine learning model(s).

Figure 3:
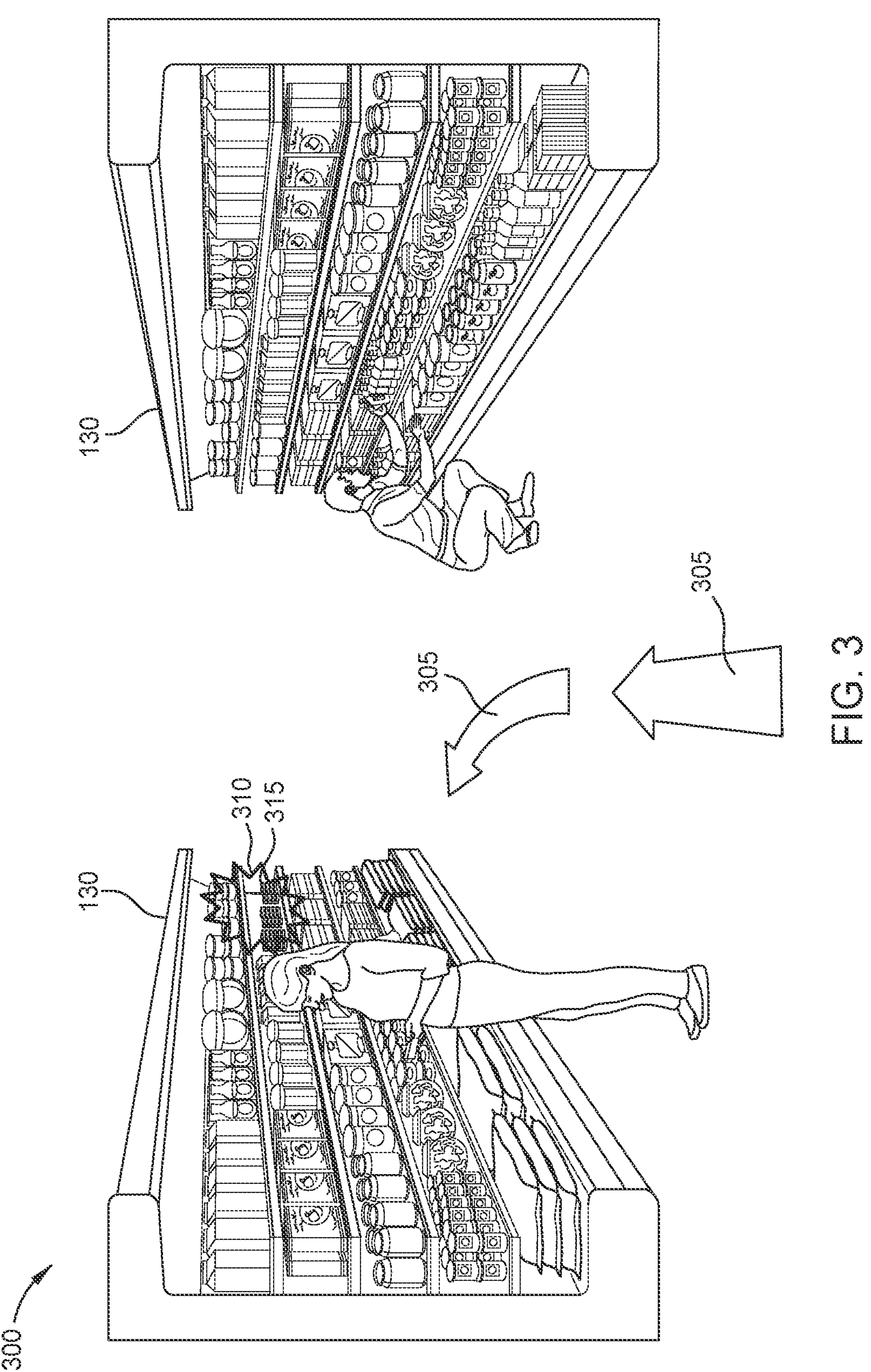
FIG. 3 depicts an example augmented reality output to improve item selection, according to one embodiment disclosed herein.

FIG. 3 depicts an example augmented reality output 300 to improve item selection, according to one embodiment disclosed herein. In some embodiments, the AR output 300 can be generated by a computing device, such as a kiosk (e.g., check-in kiosk 105 of FIG. 1A) or a user device (e.g., the user device 125 of FIG. 1A), such as a smartphone. In at least one embodiment, the AR output 300 is generated by an application on the user's device, where the application can interface with the enterprise's system(s) (e.g., with the check-in kiosk 105) to determine the recommended item(s) and location(s).

In the illustrated example, the AR output 300 corresponds to an image (captured by an image sensor, such as a smartphone's camera) with one or more augmentations added to the image (e.g., superimposed on it). In the illustrated example, one or more ground markers 305 (e.g., arrows) have been superimposed on the ground surface, and an item indicator 310 has been added to highlight or note the location of an object 315.

In some embodiments, to generate the AR output 300, the device can capture one or more images of a physical environment (e.g., the retail enterprise discussed above). The device can then evaluate the image and/or other sensor data (e.g., gyroscopes, accelerometers, proximity sensors, and the like) to identify the orientation and/or location of the device and/or image. For example, using image recognition or segmentation machine learning models, the device may identify the ground surface, shelf surfaces, and the like.

In some embodiments, the device can determine a more fine-grained location and/or orientation based on cues depicted in the image, such as text strings (e.g., aisle numbers), AR markers (e.g., codes or defined markers at locations), and the like.

In the illustrated example, once the location and/or orientation of the image is determined, the device can thereafter determine the relative location or position of one or more items in the environment. For example, the device may determine the location of a recommended item (e.g., generated by the check-in kiosk) in the retail environment. In the illustrated AR output 300, ground markers 305 are superimposed on the ground surface depicted in the image in such a way as to direct the user towards the recommended item(s). That is, based on the current location (depicted in the image) and the target location (of the recommended item), the device can augment the image with ground markers to indicate which direction the user should move, which aisle to enter, how far along the aisle to stop, and the like.

Although the illustrated example depicts arrows as the ground markers 305, in embodiments, a wide variety of markers may be used. For example, the ground markers 305 may include line(s), chevrons, and the like. Though not depicted in the illustrated example, in some embodiments, the ground markers 305 may be generated based at least in part on the identity of the item to which they direct the user. For example, the ground markers may be labeled with the item they are leading the user to, or may be color-coded, different shapes, or otherwise modified to indicate information about the target item. Similarly, in some embodiments, the ground markers 305 may be modified based on the relative distance to the item. For example, the device may adjust the size, color, shape, and/or brightness of the ground markers 305 (e.g., making them bigger and/or brighter as the user nears the item). This may allow the user to readily determine how far the item is, and/or which item to pursue first or next (e.g., to find the closest item, if markers for multiple items are depicted).

Additionally, although the illustrated example depicts ground markers 305 on the ground surface of the environment, in some embodiments, the device may additionally or alternatively use other directional markers, such as arrows or lines that appear to float in the air to point down an aisle or in the proper direction, markers on the ceiling, highlighting of the target aisle or area, and the like.

Additionally, in the illustrated example, the target object 315 itself is indicated or emphasized using an item indicator 310. That is, the object 315 may be the physical item that is recommended, and the item indicator 310 may be an augmented detail superimposed on the captured image to highlight or indicate the object 315. In some embodiments, the item indicator 310 is placed based on the determined location of the object 315 depicted in the image. For example, image recognition may be used to identify the depicted object 315, and the item indicator 310 may be placed at this determined location. In some embodiments, other cues may be used to indicate the object 315 at any given location, such as bar codes, quick response (QR) codes, and the like.

In the illustrated example, the item indicator 310 is a multi-pointed star encircling the object 315. Generally, however, any suitable indicator may be used, such as an outline of the object 315, a circle, an arrow pointing to it, and the like.

In an embodiment, the augmented images can be output for display to the user. For example, the user may use their smartphone to capture image(s) of the environment. When output for display, the image(s) are augmented with the ground markers 305 and/or item indicators 310. In some embodiments, the augmentations are added prior to outputting the image. In some embodiments, the image is output and the augmentations are superimposed on the output image/display. In at least one embodiment, the augmentation and display is performed substantially in real-time (e.g., with delay between image capture and output that is below a defined threshold), such that the user can walk or point their device around to quickly determine where the selected item(s) are.

Although the illustrated example depicts image augmentation to assist in navigation, in some embodiments, the user may use their device (e.g., the enterprise application) to perform other augmentations. As discussed in more detail below, in some embodiments the user can capture one or more images of their animal using the device, and these images may be augmented based on recommended items. For example, the user may select a recommended raincoat for their dog, and use the application to generate an AR image or video depicting their dog wearing the coat. In one such embodiment, the device can use various techniques to detect/identify the depicted location and orientation of the animal in the image, and superimpose the indicated item(s) in corresponding locations of the image such that it appears that the animal is wearing, standing next to, or otherwise interacting with the item. This can help the user readily understand the scale of the item (e.g., for proper sizing) as well as how the animal will look if the user decides to select the item for purchase.

Figure 4:
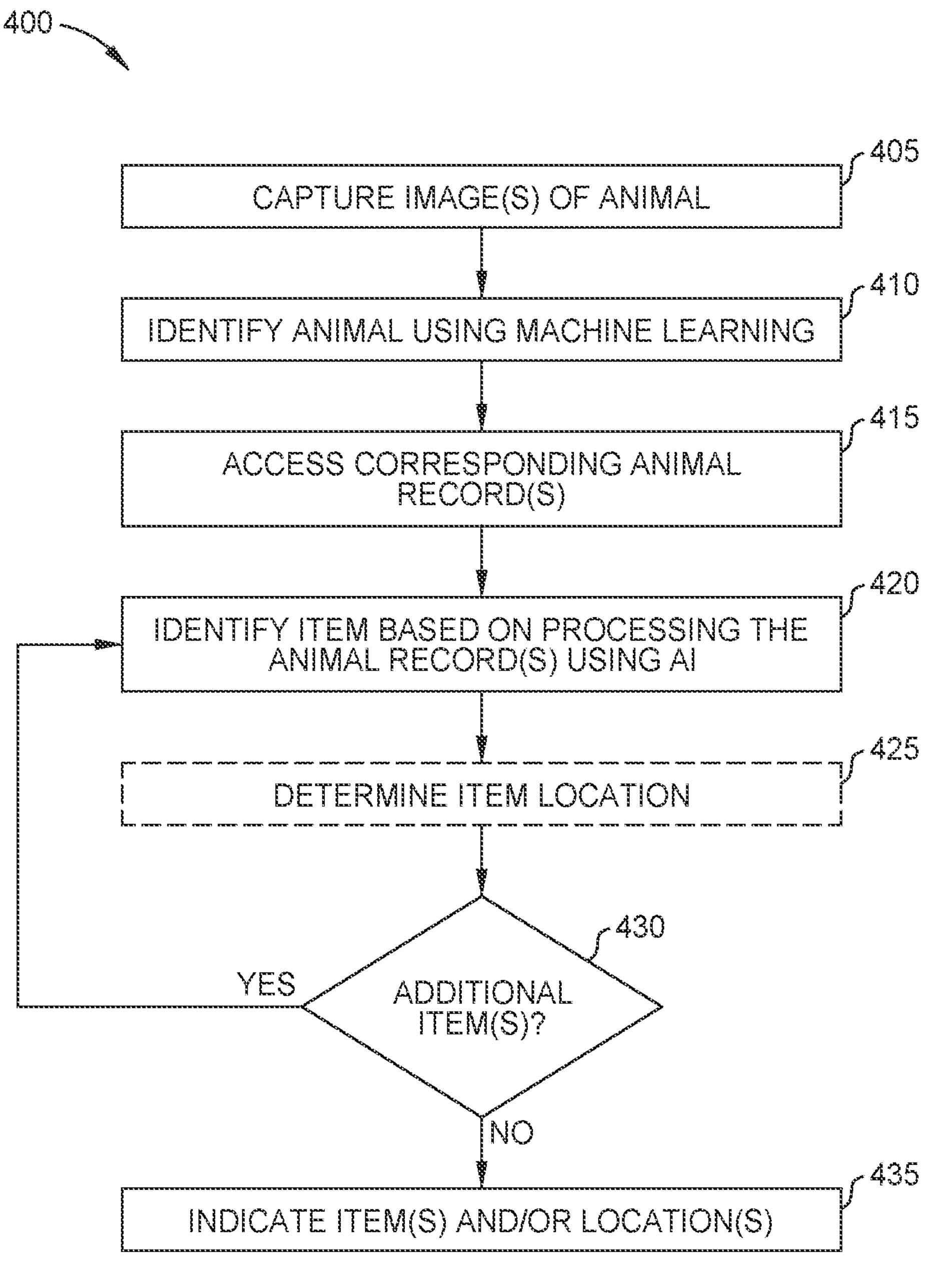
FIG. 4 is a flow diagram illustrating an example method for generating item recommendations using artificial intelligence, according to one embodiment disclosed herein.

FIG. 4 is a flow diagram illustrating an example method 400 for generating item recommendations using artificial intelligence, according to one embodiment disclosed herein. In some embodiments, the method 400 is performed by a kiosk, such as check-in kiosk 105 of FIG. 4.

At block 405, the kiosk captures or accesses one or more images of an animal. For example, as discussed above, the kiosk may include a camera device (e.g., camera device 115 of FIGS. 1A and 2) to capture the image(s) and/or may access or receive the image(s) from such a camera device. In some embodiments, as discussed above, the camera device includes an imaging sensor and an arm positioned (rigidly or moveably) to hold an object (e.g., a treat) in a position relative to the imaging sensor. This allows the camera device to more readily capture quality images for identification (e.g., without blur, properly framed, and with the animal looking or facing in a target orientation).

At block 410, the kiosk identifies the identity of the animal depicted in the captured image(s) using one or more machine learning models. As discussed above, these machine learning model(s) may be trained to uniquely identify individual animals, as opposed to simply identifying the species or breed generically. That is, the model(s) may be trained to distinguish between animals on an individual level (e.g., distinguishing a first dog "Spot" from a second dog "Champ"). In some embodiments, identifying the animal can include generating or determining a unique identifier of the animal (e.g., a number).

In some embodiments, the kiosk uses multiple models. For example, a first machine learning model may be used to classify the species of the depicted animal, a second (selected based on the determined species) to identify the breed, and a third (selected based on the identified breed) to identify the animal's identity.

In some embodiments, the kiosk uses pre-trained machine learning models to identify the animals. Although not included in the illustrated example, in some embodiments, the kiosk (or another system) can train the model(s) for animal identification. For example, the kiosk may use labeled training data (e.g., images or videos of animals, accompanied with a corresponding unique identity as the label) to iteratively update or refine the model parameter(s) such that, when provided an image as input, the generated output is an accurate identifier of the animal. In at least one embodiment, the kiosk trains a model to generate or output a vector or tensor in an embedding space based on the input image. This tensor can then be used as the unique identifier for the animal (e.g., assigned to the animal during an enrollment phase). Subsequently, when the animal has its image captured, the generated tensor can be used to look up the animal's identity/records.

Once the animal is identified, at block 415, the kiosk accesses one or more animal records related to or relevant to the identified animal. For example, the records may be tagged or labeled with, or may otherwise include the generated/determined unique identifier of the animal. Generally, the animal records can include any relevant characteristics of the animal, such as their species/breed, size, weight, target or ideal weight or size, past or present diagnoses, past or present illnesses, preferences, and the like.

At block 420, the kiosk identifies or generates one or more item suggestions or recommendations based on processing one or more of the accessed records using one or more AI models or systems. Generally, the AI may be trained to generate recommendations based on the records, such as to recommend a diet or food based on determining that the animal is underweight or overweight. In some embodiments, the AI system can consider not only the animal records, but also one or more other sources of data (as discussed above), such as inventory information, promotional information, and the like. Though not depicted in the illustrated example, in some embodiments, the kiosk (or another system) can train the AI system, such as by providing input animal records and corresponding item recommendations as the labels/target output. This can allow the AI to iteratively learn to generate effective recommendations based on input records.

At block 425, the kiosk optionally identifies the location of the identified/recommended item. That is, the kiosk can determine the physical location, in the enterprise, where the item can be found. For example, the kiosk may refer to an inventory system to determine the aisle, bay, shelf, or other location identifier for the item.

At block 430, the kiosk determines whether there are one or more recommendations generated by the AI system. If so, the method 400 returns to block 420 to identify the next recommended item. Generally, the kiosk may identify or select the next item using any suitable technique, as each recommended item will be evaluated during the method 400. Additionally, though the illustrated example depicts a sequential process (identifying and processing each item in turn) for conceptual clarity, in some embodiments the kiosk may process some or all of the items in parallel.

If the kiosk determines, at block 430, that no additional items/recommendations remain, the method 400 continues to block 435. At block 435, the kiosk indicates the recommended item(s) and/or location(s) to the user. For example, the kiosk may output them on a display of the kiosk, transmit or provide them to an application running on a user device, and the like. In some embodiments, as discussed above, the kiosk may selectively/dynamically provide the information based on user input, such as by outputting additional information when the user selects a recommendation, removing information if the user discards a recommendation, and the like.

Although not depicted in the illustrated example, in some embodiments, the kiosk may additionally assist the user to navigate to the physical location(s) of the recommended item(s). Generally, assisting the user to navigate to the items can include a wide variety of actions, such as indicating the locations (e.g., indicating the aisle/bay number and allowing the user to navigate themselves to the location) and/or providing directions (e.g., instructing the user to go down the third aisle on the left and look on the top shelf about midway down the aisle).

In some embodiments, as discussed above, assisting the user to navigate to the locations can include providing the locations to an AR application on the user's device (e.g., an application associated with or maintained by the enterprise). This AR application (which may, in some cases, be considered a component of the broader recommendation/assistance system) can then augment imagery, as discussed above, to guide the user to the locations.

Figure 5:
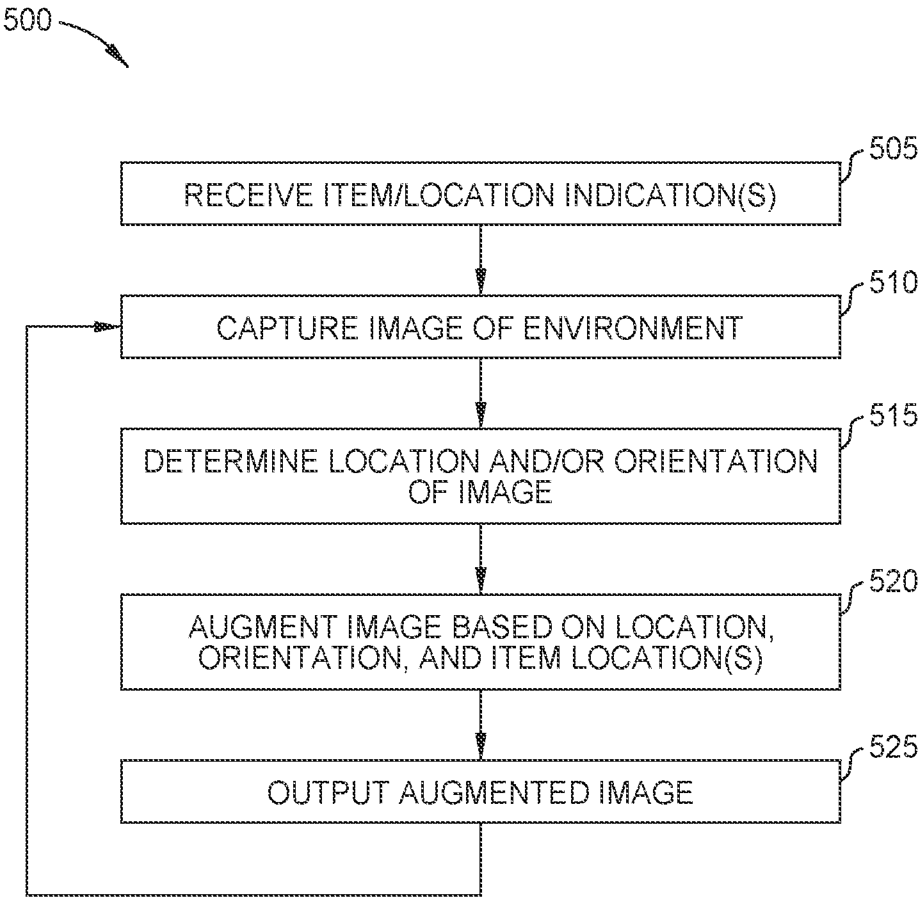
FIG. 5 is a flow diagram illustrating an example method for generating augmented images based on item recommendations, according to one embodiment disclosed herein.

FIG. 5 is a flow diagram illustrating an example method 500 for generating augmented images based on item recommendations, according to one embodiment disclosed herein. In some embodiments, the method 500 is performed by a user device (e.g., the user device 125 of FIG. 1A). For example, the method 500 may be performed by an application (e.g., an AR application) running on the user's smartphone. In some embodiments, the method 500 can be used to generate the AR output 300 of FIG. 3.

At block 505, the user device can receive one or more indications of recommended/selected item(s) and their corresponding location(s). For example, a kiosk (e.g., the check-in kiosk 105 of FIG. 1A) may provide the items/locations to the user device. In some embodiments, the kiosk can provide all of the generated recommendations. In some embodiments, the kiosk provides only the recommendations that the user has selected/accepted. For example, the user may interact with the kiosk to select or discard each recommendation, and then interact with the kiosk to cause the selected items to be indicated to the user's device.

At block 510, the user device captures an image of the physical environment (e.g., using a camera). In some embodiments, the user device captures the image in response to a user prompt. For example, the user may open the AR application and cause the AR application to open/turn on the camera to begin generating augmented imagery.

At block 515, the user device determines the location and/or orientation depicted in the image. Generally, the user device may use any suitable techniques to determine the location and/or orientation of the image.

In some embodiments, the user device uses one or more sensors on the user device to assist in identifying the location and/or orientation. For example, the user device may use accelerometer(s), gyroscope(s), compass(es), and the like to determine orientation. Similarly, the user device may determine the location using positioning systems such as global positioning system (GPS) or local positioning systems, such as by identifying detected beacons in the enterprise, determining distance to one or more WLAN access points (e.g., using fine timing measurements (FTM)), and the like.

In some embodiments, the user device determines the location and/or orientation based at least in part on what is depicted in the captured image. For example, the user device may process the image to recognize the ground/floor surface, shelf surfaces, and/or ceiling surfaces, and determine the image orientation based on this information. In some embodiments, the user device can identify cues in the image to determine the orientation and/or location. For example, in some embodiments, physical cues (such as barcodes, QR codes, or other items that are recognizable by the user device in images) may be arranged in various locations in the enterprise (e.g., one or more on each aisle endcap, one or more in positions on the floor, and the like).

In some embodiments, these cues can embed information about their positioning. For example, cues on the ground may convey different information than cues on a shelf, allowing the user device to determine orientation of the image. In some embodiments, the cues can embed more fine-grained information about their position. For example, the enterprise may be delineated into logical spaces (e.g., a grid), where each space (e.g., each grid cell) has a corresponding cue/identifier (e.g., a QR code) that can be recognized by the user device. In such an embodiment, the user device may determine its current location and/or orientation based on determining which cue(s) are visible in the image.

At block 520, once the location and orientation depicted in the image is determined, the user device augments the captured image based on the determined location, orientation and item location(s). Generally, augmenting the image can include adding one or more virtual elements to indicate the item locations. For example, the user device may superimpose arrows or lines on the floor/ground to lead the user to the item(s). That is, based on the location reflected in the image and the location of each selected item, the user device may determine directions to the item(s) and add arrows indicating these directions.

In some embodiments, the user device can augment the image by adding indicators on the items themselves, when they are visible in the image. For example, the user device may add a circle, arrow, or other indicator to highlight the position of the item (e.g., which shelf it is on).

In some embodiments, as discussed above, the user device can augment the image based on the group or set of the selected items. For example, the user device may generate multiple lines or arrows, each pointing or leading towards a corresponding item. In one such embodiment, as discussed above, the user device may generate the lines or arrows to be visually distinguishable, such as by using a different color for each item, using solid, dashed, or dotted lines, and the like. This can allow the user to determine which item they would like to retrieve next.

In at least one embodiment, rather than generating separate markers/arrows for each item, the user device may generate a single track/path through the enterprise that reaches each item location. For example, based on the item locations/distances, the user device may generate a path that efficiently orders the locations, and can be followed by the user to reach each in sequence.

In some embodiments, the user device may modify the visual appearance of the augmentations based on other information, such as the distance to the item. For example, the user device may augment the markers with text indicating the distance, or may change the size or shape of each arrow (or other marker) to indicate the distance.

In some embodiments, the user device may allow the user to selectively enable/disable augmentations for each item, such that the user can view augmentations for one (or more) items at a time while hiding others. For example, after picking up an item, the user may turn off augmentations for the item and/or enable augmentations for another item. In some embodiments, the user device may automatically enable/disable augmentations. For example, in response to determining that the user has reached the indicated location of an item, the user device may automatically disable augmentations for the item (with the assumption that the user picked it up) and enable augmentations for another item (e.g., for the next-closest item).

At block 525, the user device outputs the augmented image. For example, as discussed above, the AR application may display the image, along with the generated augmentations superimposed on the image, on a screen or display of the user device. The method 500 then returns to block 510 to capture a new image.

In this way, the method 500 enables the user device to navigate the user to the recommended/selected item(s) easily and rapidly. In some embodiments, the method 500 can be performed rapidly (e.g., substantially in real-time). For example, the user device may generate and output 30 augmented images per second (each corresponding to a frame in captured video), outputting each augmented frame shortly after the un-augmented image was captured (e.g., within a defined period of time). This can allow the user to walk, turn the user device, and the like to better navigate the space.

In some embodiments, in addition to providing navigation to the selected item(s), the user device may enable navigation to other areas of interest. For example, the user may request assistance locating the restrooms or the check-out area, and the AR application may generate similar ground markers indicating how to navigate to these areas. Additionally, though not depicted in the illustrated example, in some embodiments the user can use the user device (e.g., the AR application) to dynamically determine the location(s) of new item(s) (e.g., items that were not recommended by the kiosk, and/or items that were recommended but that the user discarded). This may allow the user to quickly find such items if they change their mind or determine they want something else.

Figure 6:
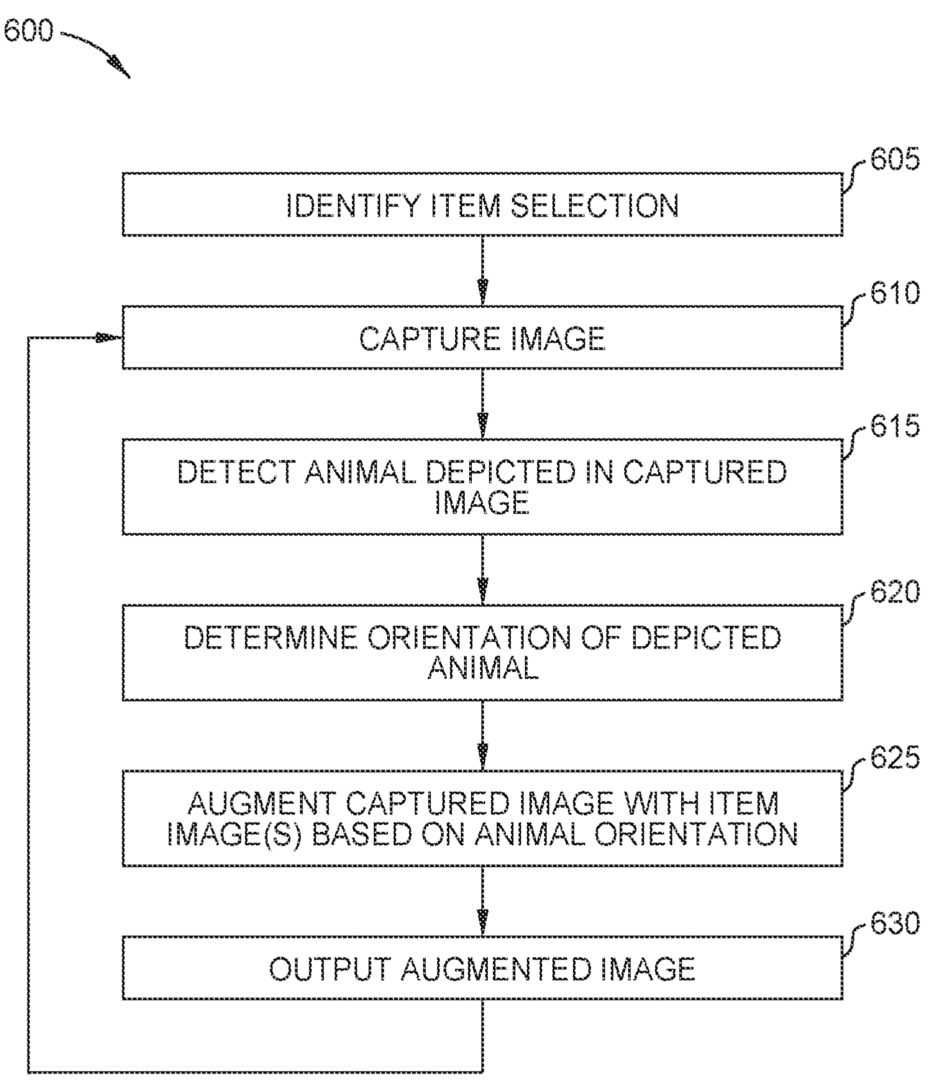
FIG. 6 is a flow diagram illustrating an example method for generating augmented images based on selected items, according to one embodiment disclosed herein.

FIG. 6 is a flow diagram illustrating an example method 600 for generating augmented images based on selected items, according to one embodiment disclosed herein. In some embodiments, the method 600 is performed by a user device (e.g., the user device 125 of FIG. 1A). For example, the method 500 may be performed by an application (e.g., an AR application) running on the user's smartphone.

At block 605, the user device identifies an item selection. For example, the user may interact with the AR application to select which item(s) they would like to visualize.

At block 610, the user device captures an image. In some embodiments, the user device captures the image in response to a user prompt. For example, the user may open the AR application and cause the AR application to open/turn on the camera to begin generating augmented imagery.

At block 615, the user device detects an animal depicted in the captured image. For example, the user device may use one or more machine learning models to identify/detect the presence of the animal. In some embodiments, the user device can determine the size of the detected animal. For example, based on the identity of the animal (e.g., determined by the kiosk and/or by the user device), the user device can evaluate the animal records to determine the animal's size (e.g., its height, length, and/or weight).

At block 620, the user device can determine the orientation of the depicted animal, relative to the user device. This determined orientation can allow the user device to generate augmentations that correspond to or match the orientation of the animal.

At block 625, the user device augments the captured image with one or more item image(s) or models based on the determined orientation and/or size of the animal. For example, the user device may retrieve a two or three-dimensional model of the item, and adjust the scale of the model based on the size of the animal (e.g., scaling the model such that it is real-sized relative to the depicted animal). The user device may similarly orient the model appropriately, if orientation is relevant. For example, if the item is a coat, the user device may orient the neck hole to be positioned at the animal's neck. As another example, if the item is a toy, the user device may scale the toy appropriately (to allow the user to determine whether the toy is sized correctly for the animal), and place the toy in or near the animal's mouth, paws, or hands. In an embodiment, augmenting the image can generally include superimposing the item (e.g., the model, or an image of the model at the appropriate scale and orientation) over the captured image.

At block 630, the user device then outputs the augmented image. For example, as discussed above, the AR application may display the image, along with the generated augmentations superimposed on the image, on a screen or display of the user device. The method 600 then returns to block 610 to capture a new image.

In this way, the method 600 enables the user device to generate accurate visualizations of how any given item will fit or look relative to the animal, allowing users to make informed decisions. In some embodiments, the method 600 can be performed rapidly (e.g., substantially in real-time). For example, the user device may generate and output 30 augmented images per second (each corresponding to a frame in captured video), outputting each augmented frame shortly after the un-augmented image was captured (e.g., within a defined period of time). This can allow the user to walk around the animal, turn the user device, and the like to better visualize the item.

Figure 7:
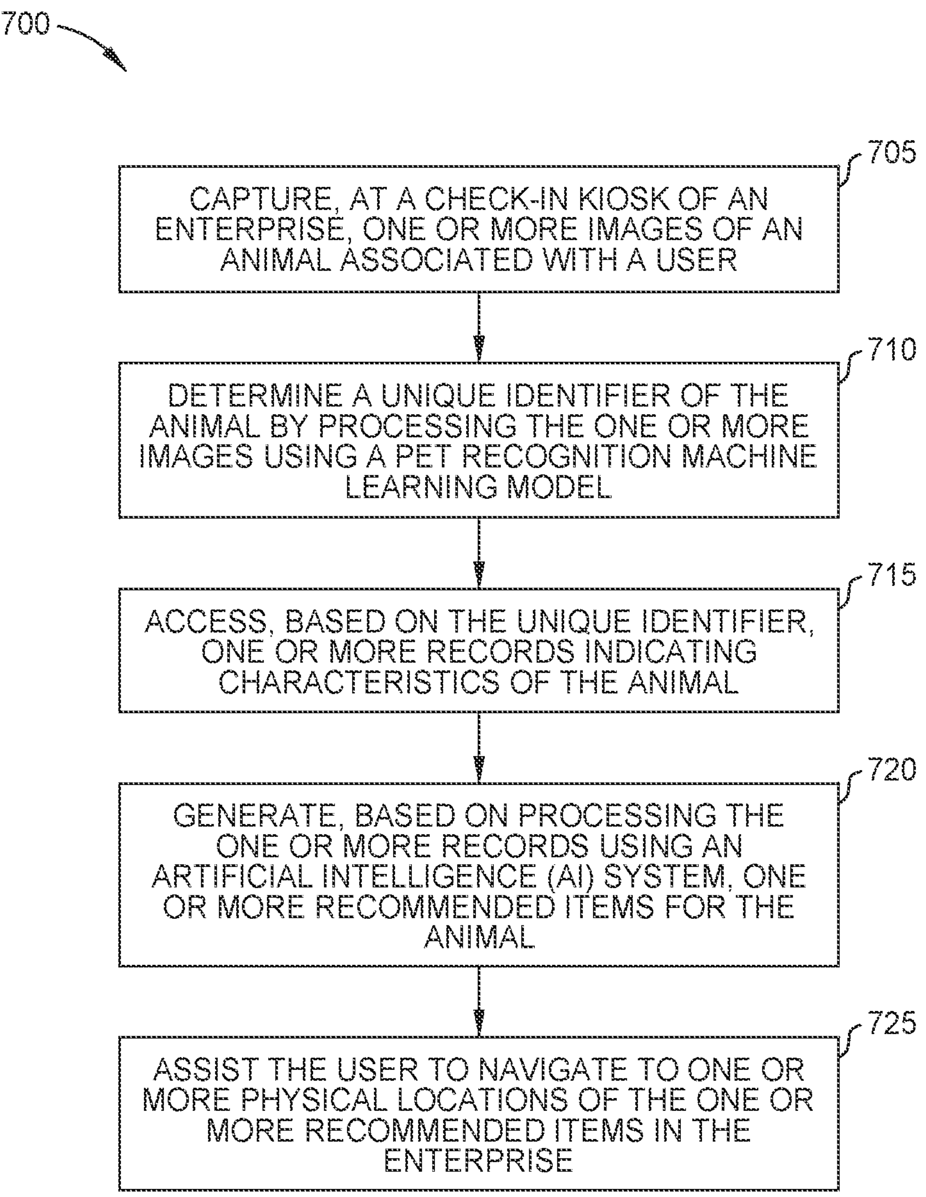
FIG. 7 is a flow diagram illustrating an example method for generating item recommendations and assisting user navigation, according to one embodiment disclosed herein.

FIG. 7 is a flow diagram illustrating an example method 700 for generating item recommendations and assisting user navigation, according to one embodiment disclosed herein. In some embodiments, the method 700 is performed by a kiosk (e.g., the check-in kiosk 105 of FIG. 1A).

At block 705, one or more images of an animal associated with a user are captured (e.g., using a camera device 115 of FIGS. 1A and 2) at a check-in kiosk (e.g., check-in kiosk of FIG. 1A) of an enterprise.

At block 710, a unique identifier of the animal is determined by processing the one or more images using an animal recognition machine learning model.

At block 715, one or more records indicating characteristics of the animal are accessed based on the unique identifier.

At block 720, one or more recommended items for the animal are generated based on processing the one or more records using an AI system.

At block 725, the user is assisted to navigate to one or more physical locations of the one or more recommended items in the enterprise.

Figure 8:
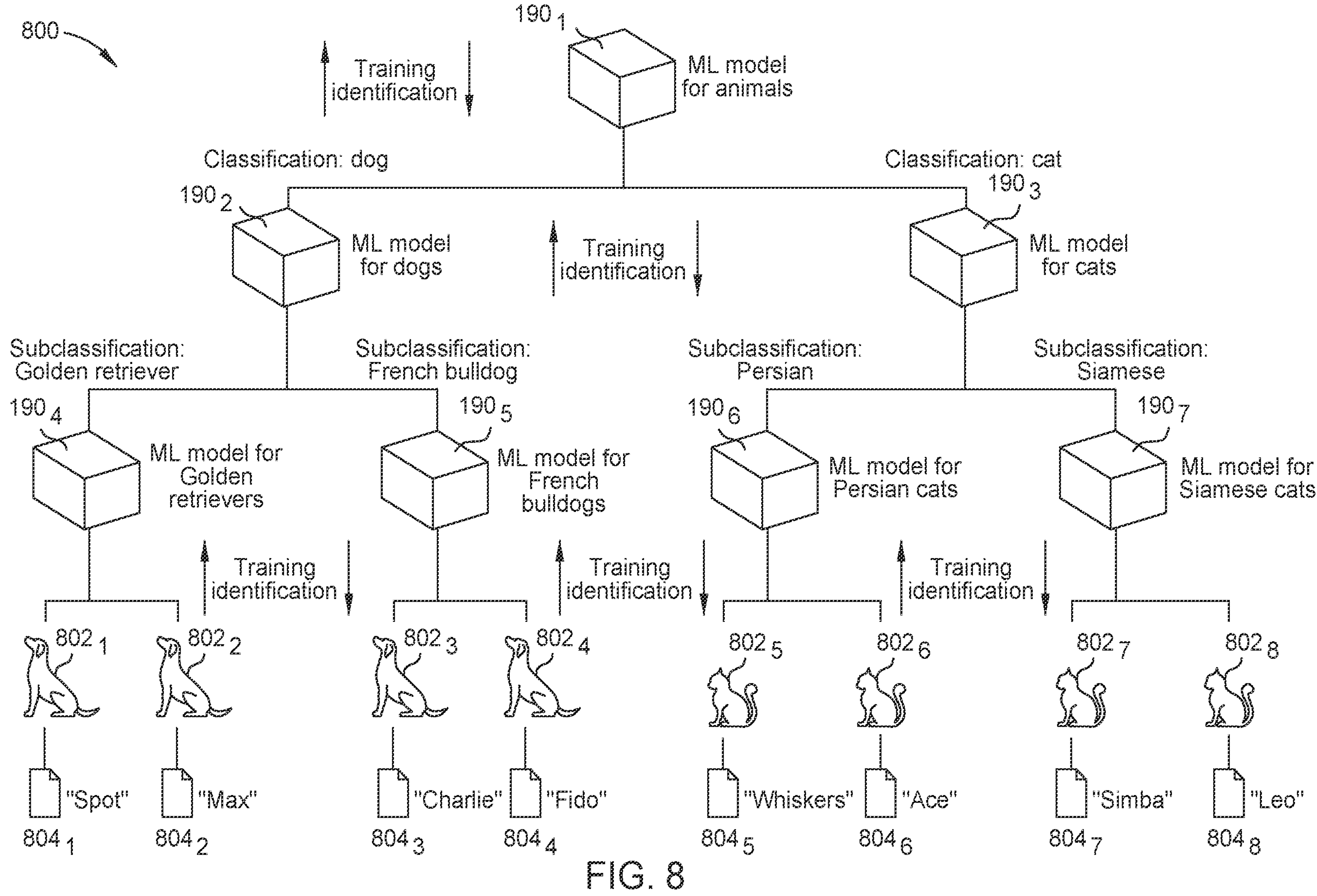
FIG. 8 depicts an example hierarchy of machine learning models to improve accuracy in classifying, subclassifying and/or identifying animals, based on animal behavior, according to one embodiment disclosed herein.

FIG. 8 depicts an example hierarchy 800 of machine learning models to improve accuracy in classifying, sub-classifying and/or identifying animals, based on animal behavior, according to one embodiment disclosed herein. As stated previously, one or more machine learning models can be used by the application to classify animals. In some embodiments, the one or more machine learning models include multiple machine learning models that constitute a hierarchy 800 of machine learning models such as the hierarchy 800.

Each machine learning model in the hierarchy 800 is trained to perform a specific type of classification of animals. Depending on the embodiment, the machine learning models in the hierarchy 800 can be trained using supervised or unsupervised learning techniques, and over a set of training data. The training data includes captured video of a set of training animals and one or more attributes associated with the set of training animals.

Depending on the embodiment, the set of training animals and a set of animals desired to be identified after the training is complete can be mutually exclusive or can overlap at least to some extent. If the sets of animals are mutually exclusive, the training data based on the set of training animals can be provided by an administrative user of the enterprise rather than by an end-user of the enterprise. The trained machine learning models can then be used to classify a given animal. Further, the trained machine learning models can be refined over time based on classifying existing animals and learning about new animals.

In one embodiment, the machine learning models can learn about the new animals such as via video footage captured at the kiosk 154 of FIG. 1B and via one or more attributes supplied based on user input and retrieved from the animal record by the application. For instance, the one or more attributes can inform the machine learning models of the type and breed of a new animal, where the type and breed are supplied based on user input. The one or more attributes can further inform the machine learning models as to a size, an age, and weight of the new animal, for instance.

As part of the process of learning about the new animal, the machine learning models can learn associations between aspects of the captured video footage and the one or more attributes supplied as input data, and these associations can be used to identify the new animal based on new video footage of the new animal during a subsequent visit by the user top the enterprise. In an alternative embodiment, however, the one or more attributes are not provided to the machine learning models as input data, and such machine learning models learn to identify new animals based on the captured footage and not based on any such attributes. Still alternatively, the one or more attributes can be provided to the machine learning model trained to take as input data a single, captured image of the animal.

As shown, the hierarchy 800 is organized in the form of three hierarchy levels of successively finer granularity in terms of animal classification. In other embodiments, hierarchies of hierarchy levels greater than or less than three in number can be used. A first one of the hierarchy levels includes a machine learning model $\mathbf{190}_1$ that performs a first classification of animals as being a type of animal that is recognizable by the machine learning model $\mathbf{190}_1$. For instance, each animal can be classified as being a dog, a cat, and so on.

A second one of the hierarchy levels includes machine learning models $\mathbf{190}_{2\text{-}3}$. that perform a second, finer-grained classification of types of animals as being a certain breed of animal that is recognizable by the machine learning models $\mathbf{190}_{2\text{-}3}$. For example, each dog can be classified as being a golden retriever, a French bulldog, and so forth. As another example, each cat can be classified as being a Persian cat, a Siamese cat, etc.

A third one of the hierarchy levels includes machine learning models $\mathbf{190}_{4\text{-}7}$ that perform a third classification, still finer-grained than the second classification, of breeds of animals as being a uniquely identifiable animal that is recognizable by the machine learning models $\mathbf{190}_{4\text{-}7}$. For instance, each golden retriever can be classified as being a dog $\mathbf{802}_1$ named Spot, a dog $\mathbf{802}_2$ named Max, etc. Further, each French bulldog can be classified as being a dog $\mathbf{802}_3$ named Charlie, a dog $\mathbf{802}_4$ named Fido, etc. Moreover, each Persian cat $\mathbf{802}_5$ can be classified as being a cat $\mathbf{802}_5$ named Whiskers, a cat $\mathbf{802}_6$ named Ace, etc. In addition, each Siamese cat can be classified as being a cat $\mathbf{802}_7$ named Simba, a cat $\mathbf{802}_8$ named Leo, etc.

In one embodiment, once a uniquely identifiable animal is recognized, the application can determine, from the animal records $\mathbf{804}_{1\text{-}8}$, one or more animal records that correspond to recognized animal of the recognizable animals $\mathbf{802}_{1\text{-}8}$. An indication of the recognized animal, such as one or more attributes from the one or more animal records, can then be generated by the application and output. The one or more attributes can include, without limitation, an animal name, an animal species, an animal breed, an animal sex, and/or an animal identifier.

Additionally or alternatively, the one or more attributes can include, without limitation an animal age and one or more animal size parameters such animal as height, animal length, and animal width. Still additionally or alternatively, the one or more attributes can include, without limitation, an associated user name, an associated user identifier, a store name of a store associated with the user, a store location of the store, a store identifier of the store, a veterinarian name of a veterinarian associated with the first animal, and a veterinarian identifier of the veterinarian.

Depending on the embodiment, each of the machine learning models $\mathbf{190}_{1\text{-}7}$ can be a different machine learning model or the same machine learning model. In some embodiments, some, but not all, of the machine learning models correspond to a same model. Additionally or alternatively, the hierarchy can be ragged in structure rather than being balanced in structure. As used herein, a hierarchy that is ragged in structure has a number of hierarchy levels that is uneven across a breadth of the hierarchy.

For instance, the machine learning models $\mathbf{190}_{2,4,5}$ for classifying dogs can be separate machine learning models, while the machine learning models $\mathbf{190}_{3,6,7}$ for classifying cats can be the same machine learning model. In some embodiments, the structure of the hierarchy changes over time and as the machine learning model continues to learn based on usage. For instance, the hierarchy can go from having a balanced structure to subsequently having a ragged structure and still subsequently having a balanced structure again.

Figure 9:
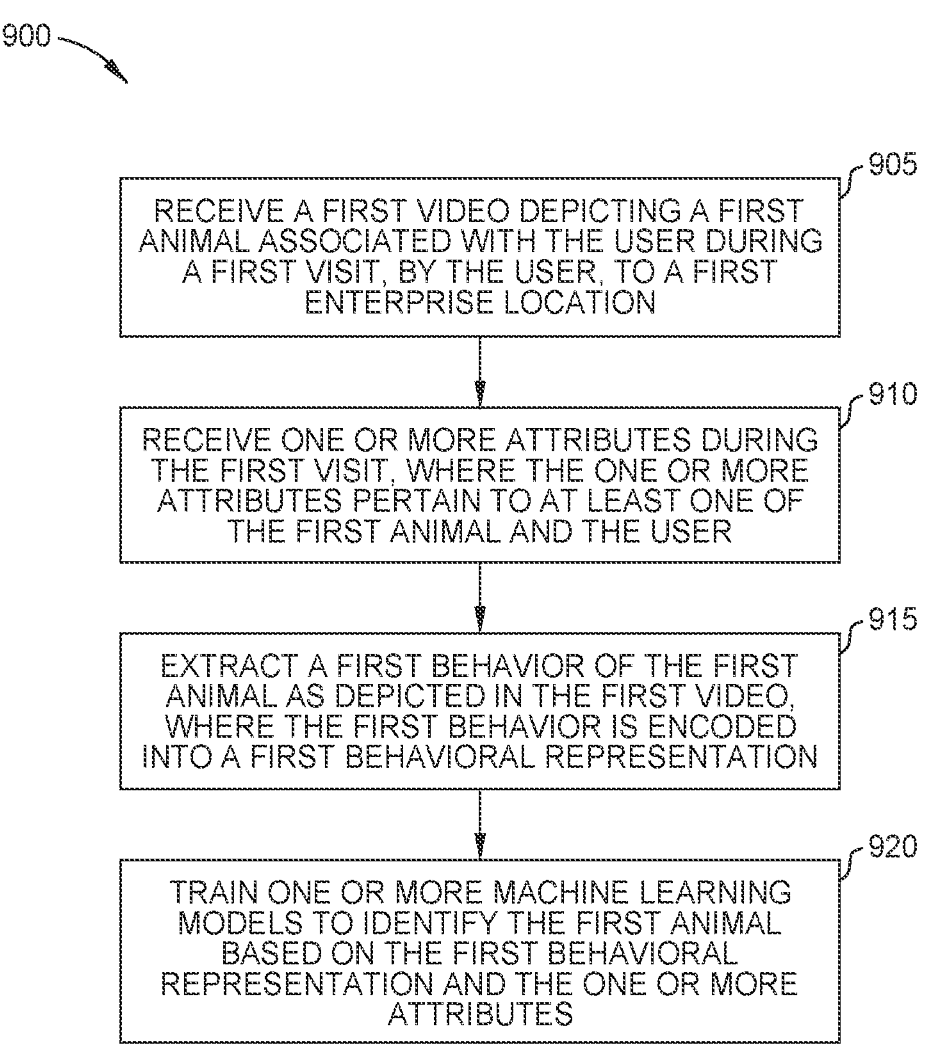
FIG. 9 is a flow diagram illustrating an example method for training one or more machine learning models to identify a new animal based on animal behavior, according to one embodiment disclosed herein.

FIG. 9 is a flow diagram illustrating an example method 900 for training one or more machine learning models to identify a new animal based on animal behavior, according to one embodiment disclosed herein. The method 900 can be performed by an application operatively connected to a kiosk such as the kiosk 154 of FIG. 1B. As shown, the method 900 begins at step 905, where the application receives a first video depicting a first animal associated with the user during a first visit, by the user, to a first location of an enterprise.

At step 910, the application receives one or more attributes during the first visit, where the one or more attributes pertain to at least one of the first animal and the user. At step 915, the application extracts a first behavior of the first animal as depicted in the first video, where the first behavior is encoded into a vector representation, e.g., into a first behavioral embedding. Encoding the first behavior into the vector representation lowers a measure of dimensionality of the input data, namely, the first behavior, to the one or more machine learning models.

In some embodiments, because the input data of the lowered measure dimensionality is more readily processed by the one or more machine learning models, encoding the first behavior improves a measure of processing efficiency of the one or more machine learning models and allows the one or more machine learning models to process greater amounts of data. For instance, the one or more machine learning models can be allowed to process captured video footage of greater lengths in time duration and/or of greater image resolution.

At step 920, the one or more machine learning models are trained to identify the first animal based at least in part on the first behavioral embedding and the one or more attributes. After the step 920, the method 900 terminates.

Figure 10:
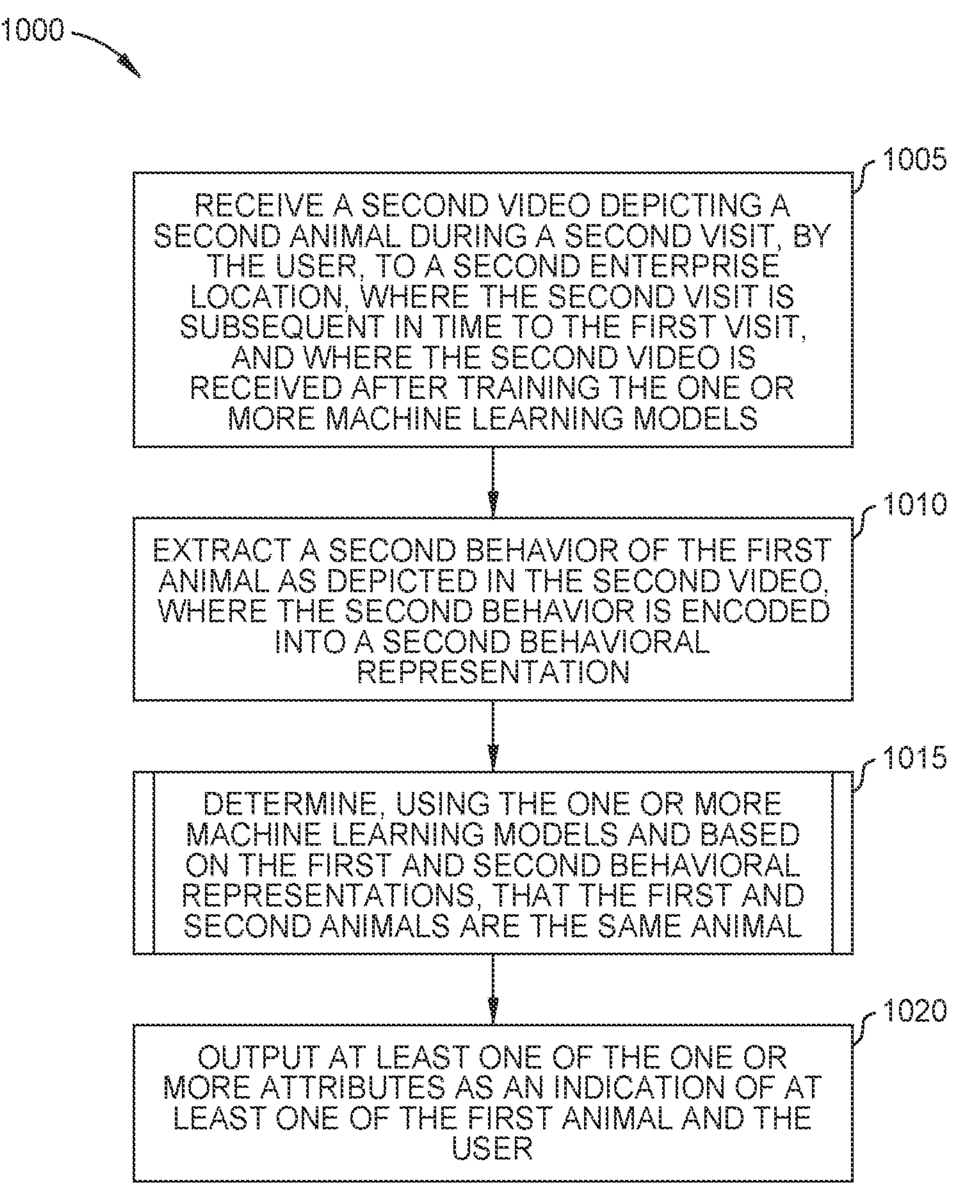
FIG. 10 is a flow diagram illustrating an example method for using the trained one or more machine learning models to identify the new animal based on subsequent animal behavior, according to one embodiment disclosed herein.

FIG. 10 is a flow diagram illustrating an example method 1000 for using the trained one or more machine learning models to identify the new animal based on subsequent animal behavior, according to one embodiment disclosed herein. The method 1000 can be performed by an application operatively connected to a kiosk such as the kiosk 154 of FIG. 1B.

As shown, the method 1000 begins at step 1005, where the application receives a second video depicting a second animal during a second visit, by the user, to a second location of the enterprise. The second visit is subsequent in time to the first visit. Further, the second video is received after training the one or more machine learning models based on the first video—as described in conjunction with FIG. 9.

At step 1010, the application extracts a second behavior of the first animal as depicted in the second video, where the second behavior is encoded into a vector representation, e.g., into a second behavioral embedding. At step 1015, the application determines, using the one or more machine learning models and based on the first and second behavioral embeddings, that the first and second animals are the same animal. The step 1015 is further described below in conjunction with FIG. 11. At step 1020, the application outputs at least one of the one or more attributes as an indication of at least one of the first animal and the user. After the step 1020, the method 1000 terminates.

Figure 11:
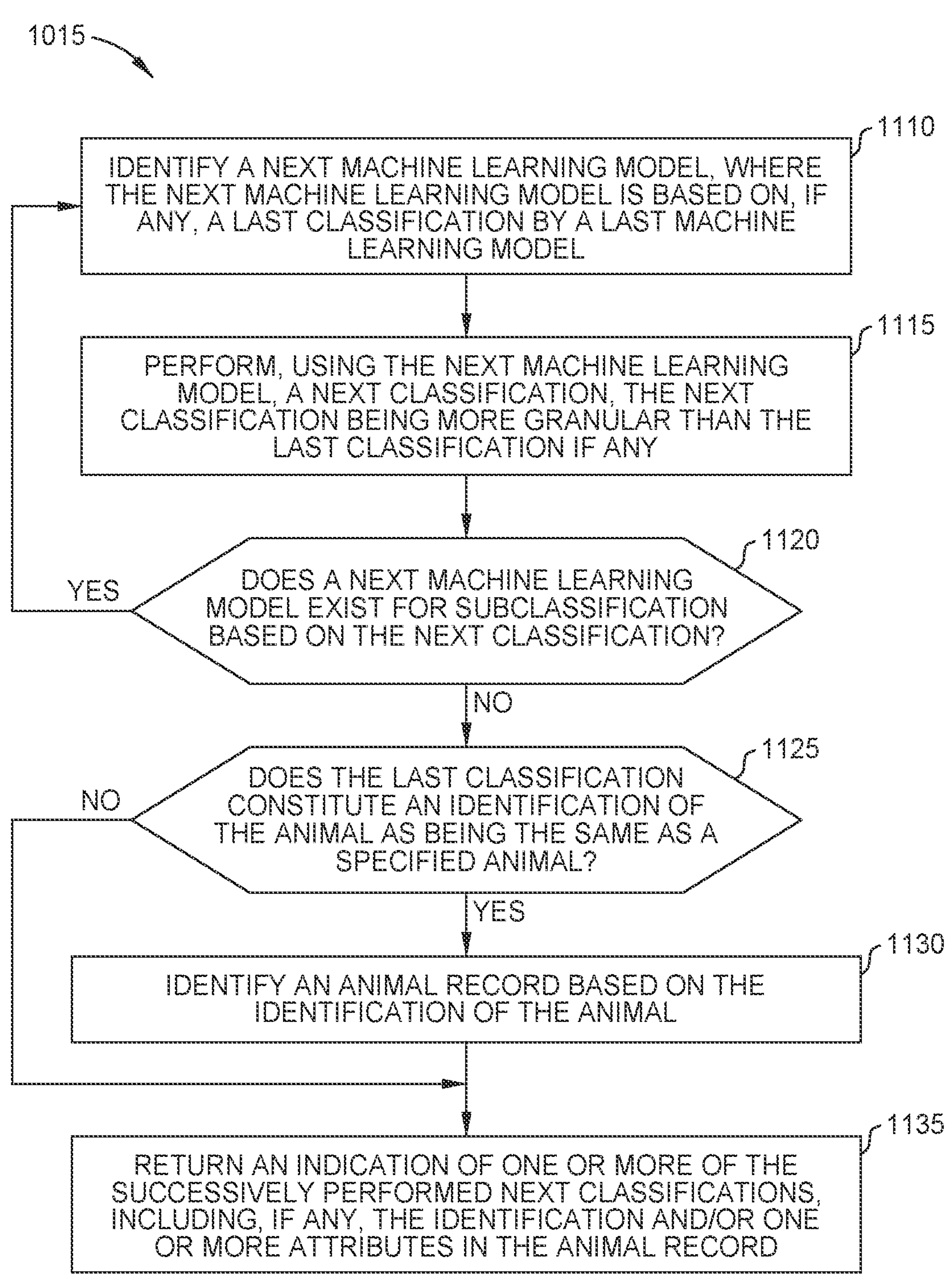
FIG. 11 is a flow diagram illustrating an example method for using the trained one or more machine learning models to determine whether two animals under evaluation by the one or more machine learning models are deemed as being the same animal, according to one embodiment disclosed herein.

FIG. 11 is a flow diagram illustrating an example method for using the trained one or more machine learning models to determine whether two animals under evaluation by the one or more machine learning models are deemed as being the same animal, according to one embodiment disclosed herein. For instance, this method can be performed to determine whether a given animal that is part of a query corresponds to an existing animal of a universe of animals recognizable by the one or more machine learning models. The method corresponds to the step 1015 of FIG. 10. Further, the method can be performed by an application operatively connected to a kiosk such as the kiosk 154 of FIG. 1B.

As shown, the method begins at step 1110, where the application identifies a next machine learning model. The next machine learning model is based on a last classification, if any, by a last machine learning model. In this regard, the next machine learning model can be of a type that corresponds to the last classification. At step 1115, the application performs a next classification using the next machine learning model. The next classification is more granular than, if any, the last classification.

At step 1120, the application determines whether a next machine learning model exists to further classify, or subclassify, the given animal. If so, the method returns to the step 1110 to further classify the given animal using the next machine learning model. Otherwise, then at step 1125, the application determines whether the last classification constitutes an identification of the given animal as being the same as a specified animal from the universe of animals recognizable by the one or more machine learning models.

If so, then at step 1130, the application identifies an animal record based on the identification of the given animal. Otherwise, or after the step 1130, then at step 1135, the application returns an indication of one or more of the next classifications, which were performed successively in the steps 1110 through 1120. The next classifications can include, if any, the identification and/or one or more attributes in the animal record that corresponds to the identification.

At least in some embodiments, each classification, subclassification, and/or identification can be determined by the one or more machine learning models based on a similarity measure. For instance, the similarity measure can be a cosine similarity function that determines a measure of summarily between two vector representations in a dimensional space of the machine learning models. Each vector representation corresponds to the given animal or to a class or entity recognizable by the one or more machine learning models. After the step 1135, the method terminates.

Figure 12:
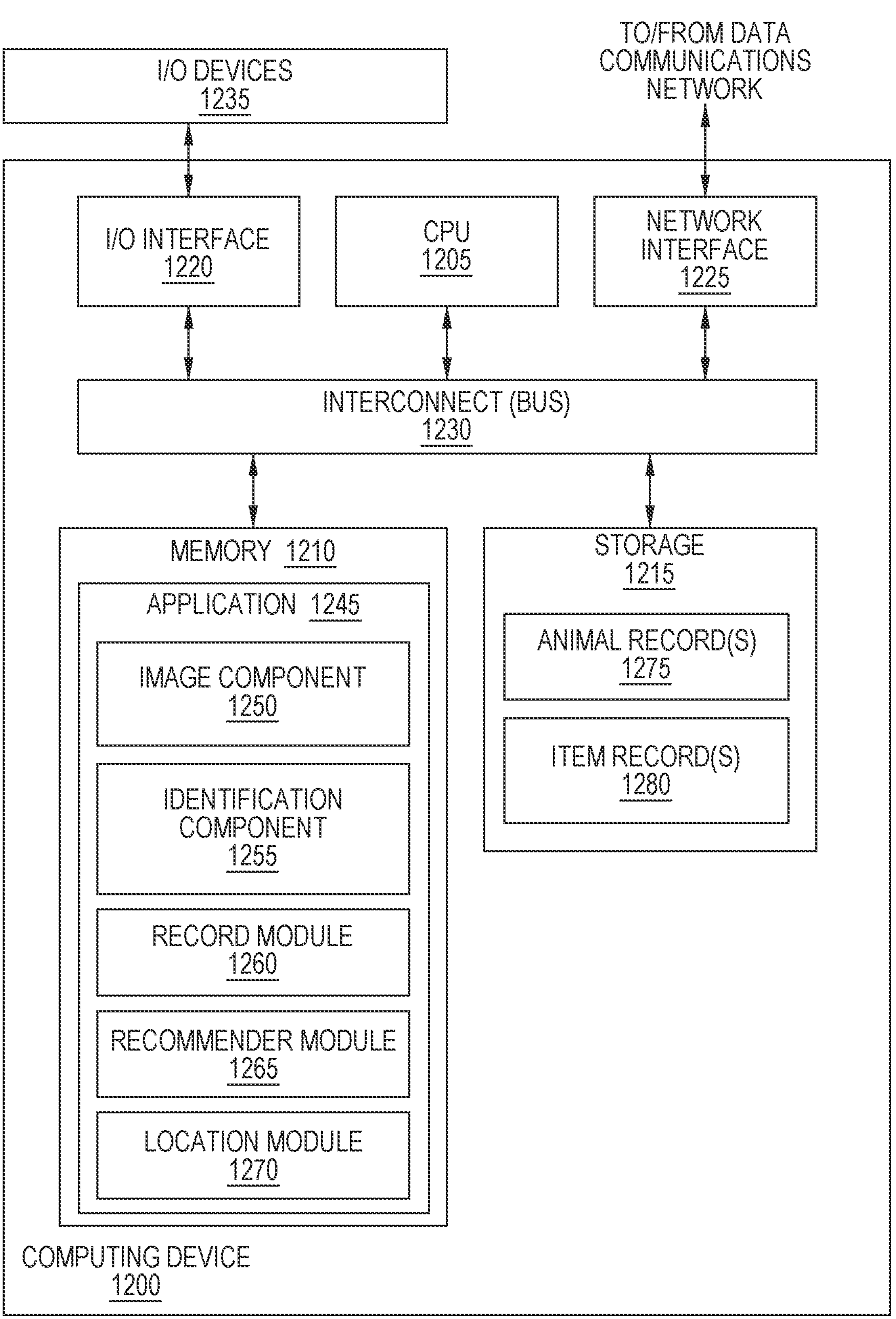
FIG. 12 depicts an example computing device configured to perform various aspects of the present disclosure, according to some embodiments of the present disclosure.

FIG. 12 depicts an example computing device 1200 configured to perform various aspects of the present disclosure, according to some embodiments of the present disclosure. Although depicted as a physical device, in embodiments, the computing device 1200 may be implemented using virtual device(s), and/or across a number of devices (e.g., in a cloud environment). In one embodiment, the computing device 1200 corresponds to a kiosk, such as a check-in kiosk 105 of FIG. 1A or the kiosk 152 of FIG. 1B.

As illustrated, the computing device 1200 includes a CPU 1205, memory 1210, storage 1215, a network interface 1225, and one or more I/O interfaces 1220. In the illustrated embodiment, the CPU 1205 retrieves and executes programming instructions stored in memory 1210, as well as stores and retrieves application data residing in storage 1215. The CPU 1205 is generally representative of a single CPU and/or GPU, multiple CPUs and/or GPUs, a single CPU and/or GPU having multiple processing cores, and the like. The memory 1210 is generally included to be representative of a random access memory. Storage 1215 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 1235 (such as keyboards, monitors, etc.) are connected via the I/O interface(s) 1220. Further, via the network interface 1225, the computing device 1200 can be communicatively coupled with one or more other devices and components (e.g., via a network, which may include the Internet, local network(s), and the like). As illustrated, the CPU 1205, memory 1210, storage 1215, network interface(s) 1225, and I/O interface(s) 1220 are communicatively coupled by one or more buses 1230.

In the illustrated embodiment, the memory 1210 includes an application 1245 configured to perform one or more embodiments described herein. For instance, the application 1245 can perform one or more of the methods of FIGS. 4-7 and 9-11. In some embodiments, the application 1245 can contain components such as an image component 1250, an identification component 1255, a record component 1260, a recommender component 1265, and a location component 1270.

Although depicted as a discrete component for conceptual clarity, in embodiments, the operations of the depicted component (and others not illustrated) may be combined or distributed across any number of components. Further, although depicted as software residing in memory 1210, in embodiments, the operations of the depicted component (and others not illustrated) may be implemented using hardware, software, or a combination of hardware and software.

In one embodiment, the image component 1250 may be used to capture images of animals in the environment, as discussed above. For example, the image component (which may correspond to or include the camera device 115 of FIGS. 1A and 2) may include or use an imaging sensor and an arm physically arranged to hold an item (e.g., a treat) in a position relative to the imaging sensor, as discussed above. Generally, the image component 1250 can be used to capture image(s) of animals, such that the images can be processed to identify the animal depicted.

In an embodiment, the identification component 1255 may be used to process captured images (e.g., captured by the image component 1250) to identify the animal(s) depicted. For example, as discussed above, the identification component 1255 may process the image(s) using one or more machine learning models to identify the animal(s). Generally, identifying the animals may include determining or identifying the identity of the animal (e.g., its name/owner or other unique identifier).

In some embodiments, the record component 1260 can be used to access or retrieve animal records (e.g., from animal records 1275) that are relevant to the identified animal (e.g., identified by the identification component 1255). For example, as discussed above, the record component 1260 may retrieve records that are labeled with or otherwise include the identifier of the animal and/or the owner of the animal. As discussed above, the record component 1260 may retrieve data from any number and variety of repositories and other data sources, such as from veterinary records, breeder records, groomer records, user profiles, and the like.

In an embodiment, the recommender component 1265 may evaluate the records (e.g., retrieved by the record component 1260) to generate recommendations for the animal. For example, as discussed above, the recommender component 1265 may use AI to suggest items, such as foods or treats, toys, and the like.

In an embodiment, the location component 1270 may be used to determine the physical location(s) of each recommended item (e.g., each item recommended by the recommender component 1265) in the enterprise. For example, the location component 1270 may evaluate inventory records (e.g., item records 1280) to confirm that each item is in stock, as well as the location of the item (e.g., the aisle and/or bay). In some embodiments, the recommended items and corresponding locations can then be provided to the user (e.g., output via a display, transmitted to a user device, and the like).

In the illustrated example, the storage 1215 includes animal record(s) 1275 and item record(s) 1280. In some embodiments, the animal records(s) 1275 generally indicate various characteristics of one or more animals, as discussed above. The item record(s) 1280 may indicate information for items in the enterprise, such as the number of each item in stock, descriptions of each, the physical location of each, and the like. Although depicted as residing in storage 1215, the animal records 1275 and item records 880 may be stored in any suitable location, including memory 1210.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the identification component 1255, record component 1260, recommender component 1265, and/or location component 1270 could execute on a computing system in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:

receiving a first video depicting a first animal associated with a user during a first visit, by the user, to a first enterprise location, the first animal being of a given type, wherein the first video is captured to facilitate enrolling the first animal in an identification program;

receiving one or more attributes during the first visit, wherein the one or more attributes pertain to the first animal;

associating the first animal with the user, wherein an indication of the association is stored;

extracting a first behavior of the first animal as depicted in the first video, wherein the first behavior comprises a measure of physical action and movement exerted by the first animal within a physical proximity and during a predetermined reference period of time;

encoding the first behavior comprising the measure of physical action and movement exerted by the first animal within the physical proximity and during the predetermined reference period of time into the first behavioral representation;

training one or more machine learning models to uniquely identify the first animal based on the first behavioral representation and the one or more attributes;

receiving one or more images depicting a second animal during a second visit, by the user, to a second enterprise location, wherein the second visit is subsequent in time to the first visit, wherein the first and second enterprise locations are selected from the same enterprise location or different enterprise locations;

determining, by an application using the one or more machine learning models and based on the one or more images, that the first and second animals are the same animal; and responsive to determining that the first and second animals are the same animal, identifying the user based on the association, and wherein identifying the user facilitates a transaction pertaining to the same animal at the second enterprise location.

2. The computer-implemented method of claim 1, wherein the one or more images are of a second video, and wherein the application is configured to:

Extract a second behavior of the first animal as depicted in the second video, wherein the second behavior comprises a second measure of physical action and movement exerted by the first animal within the physical proximity and during a second predetermined reference period of time and is encoded into a second behavioral representation.

3. The computer-implemented method of claim 2, wherein the application is further configured to:

determine, using the one or more machine learning models and based on the first and second behavioral representations, that the first and second animals are the same animal; and output at least one of the one or more attributes as an indication of the first animal.

4. The computer-implemented method of claim 3, wherein the application is further configured to, upon determining that the second animal does not match any animal known to the application, output an indication that the second animal is unrecognized.

5. The computer-implemented method of claim 1, wherein the one or more attributes include an animal name, an animal species, an animal breed, an animal sex, an animal identifier, a user name, a user identifier, a store name of a store associated with the user, a store location of the store, a store identifier of the store, a veterinarian name of a veterinarian associated with the first animal, and a veterinarian identifier of the veterinarian.

6. The computer-implemented method of claim 1, wherein the one or more machine learning models include a plurality of machine learning models arranged in a hierarchy of several levels, wherein the hierarchy is ragged in structure, and wherein the structure of the hierarchy changes over time.

7. A non-transitory computer-readable medium containing a program executable to perform an operation comprising:

receiving a first video depicting a first animal associated with a user during a first visit, by the user, to a first enterprise location, the first animal being of a given type, wherein the first video is captured to facilitate enrolling the first animal in an identification program;

receiving one or more attributes during the first visit, wherein the one or more attributes pertain to the first animal;

associating the first animal with the user, wherein an indication of the association is stored;

extracting a first behavior of the first animal as depicted in the first video, wherein the first behavior comprises a measure of physical action and movement exerted by the first animal within a physical proximity and during a predetermined reference period of time;

encoding the first behavior comprising the measure of physical action and movement exerted by the first animal within the physical proximity and during the predetermined reference period of time into the first behavioral representation;

training one or more machine learning models to uniquely identify the first animal based on the first behavioral representation and the one or more attributes;

receiving one or more images depicting a second animal during a second visit, by the user, to a second enterprise location, wherein the second visit is subsequent in time to the first visit, wherein the first and second enterprise locations are selected from the same enterprise location or different enterprise locations; and upon determining, by the program using the one or more machine learning models and based on the one or more images, that the first and second animals are the same animal, identifying the user based on the association, and wherein identifying the user facilitates a transaction pertaining to the same animal at the second enterprise location.

8. The non-transitory computer-readable medium of claim 7, wherein the one or more images are of a second video, and wherein the program is configured to:

extract a second behavior of the first animal as depicted in the second video, wherein the second behavior comprises a second measure of physical action and movement exerted by the first animal within the physical proximity and during a second predetermined reference period of time and is encoded into a second behavioral representation.

9. The non-transitory computer-readable medium of claim 8, the program further configured to:

determine, using the one or more machine learning models and based on the first and second behavioral representations, that the first and second animals are the same animal; and output at least one of the one or more attributes as an indication of the first animal.

10. The non-transitory computer-readable medium of claim 9, wherein the program is further configured to, upon determining that the second animal does not match any animal known to the application, output an indication that the second animal is unrecognized.

11. The non-transitory computer-readable medium of claim 7, wherein the one or more attributes include an animal name, an animal species, an animal breed, an animal sex, an animal identifier, a user name, a user identifier, a store name of a store associated with the user, a store location of the store, a store identifier of the store, a veterinarian name of a veterinarian associated with the first animal, and a veterinarian identifier of the veterinarian.

12. A system comprising:

one or more computer processors; and a memory containing a program executable by the one or more computer processors to perform an operation comprising:

receiving a first video depicting a first animal associated with a user during a first visit, by the user, to a first enterprise location, the first animal being of a given type, wherein the first video is captured to facilitate enrolling the first animal in an identification program;

receiving one or more attributes during the first visit, wherein the one or more attributes pertain to the first animal;

associating the first animal with the user, wherein an indication of the association is stored;

extracting a first behavior of the first animal as depicted in the first video, wherein the first behavior comprises a measure of physical action and movement exerted by the first animal within a physical proximity and during a predetermined reference period of time;

encoding the first behavior comprising the measure of physical action and movement exerted by the first animal within the physical proximity and during the predetermined reference period of time into the first behavioral representation;

training one or more machine learning models to uniquely identify the first animal based on the first behavioral representation and the one or more attributes;

receiving one or more images depicting a second animal during a second visit, by the user, to a second enterprise location, wherein the second visit is subsequent in time to the first visit, wherein the first and second enterprise locations are selected from the same enterprise location or different enterprise locations; and upon determining, by the program using the one or more machine learning models and based on the one or more images, that the first and second animals are the same animal, identifying the user based on the association, and wherein identifying the user facilitates a transaction pertaining to the same animal at the second enterprise location.

13. The system of claim 12, wherein the one or more images are of a second video, and wherein the program is configured to:

extract a second behavior of the first animal as depicted in the second video, wherein the second behavior comprises a second measure of physical action and movement exerted by the first animal within the physical proximity and during a second predetermined reference period of time and is encoded into a second behavioral representation.

14. The system of claim 13, the program further configured to:

determine, using the one or more machine learning models and based on the first and second behavioral representations, that the first and second animals are the same animal; and output at least one of the one or more attributes as an indication of the first animal.

15. The system of claim 14, wherein the program is further configured to, upon determining that the second animal does not match any animal known to the application, output an indication that the second animal is unrecognized.

16. The system of claim 12, wherein the one or more attributes include an animal name, an animal species, an animal breed, an animal sex, an animal identifier, a user name, a user identifier, a store name of a store associated with the user, a store location of the store, a store identifier of the store, a veterinarian name of a veterinarian associated with the first animal, and a veterinarian identifier of the veterinarian.

17. The computer-implemented method of claim 1, wherein based on the first behavioral representation, whether the first and second animals are the same animal is determined with a higher measure of accuracy or efficiency than absent the first behavioral representation, and wherein the transaction is completed at the second enterprise location.

18. The computer-implemented method of claim 17, wherein the first video is captured responsive to a request, from the user, to enroll the first animal in the identification program to facilitate identification of the first animal during a subsequent visit to the first enterprise location or a second enterprise location.

19. The computer-implemented method of claim 18, wherein completing the transaction comprises:

generating one or more recommendations for the same animal, each recommendation pertaining to a product or a service for the same animal; and responsive to a selection, by the user, of a first of the one or more recommendations, adding the product or the service to which the first recommendation pertains, to the transaction.

20. The computer-implemented method of claim 19, wherein the one or more machine learning models include a plurality of machine learning models arranged in a hierarchy of several levels, wherein the hierarchy is ragged in structure, and wherein the structure of the hierarchy changes over time.

* * * * *